US012775782B2

(12) United States Patent
Chen

(10) Patent No.: US 12,775,782 B2
(45) Date of Patent: Oct. 27, 2026

(54) REPLY CONTENT PROCESSING METHOD AND INTERACTION METHOD FOR INTERACTIVE CONTENT OF MEDIA CONTENT

(71) Applicant: Tencent Technology (Shenzhen) Company Limited, Shenzhen (CN)

(72) Inventor: Xiaoshuai Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 275 days.

(21) Appl. No.: 18/597,135

(22) Filed: Mar. 6, 2024

(65) Prior Publication Data

US 2024/0265198 A1 Aug. 8, 2024

Related U.S. Application Data

(63) Continuation of application No. PCT/CN2023/088099, filed on Apr. 13, 2023.

(30) Foreign Application Priority Data

Jul. 28, 2022 (CN) ........................ 202210904173.0

(51) Int. Cl.
*G06F 40/169* (2020.01)
*G06F 40/126* (2020.01)
(Continued)

(52) U.S. Cl.
CPC .......... *G06F 40/169* (2020.01); *G06F 40/126* (2020.01); *G06F 40/194* (2020.01); *G06F 40/279* (2020.01)

(58) Field of Classification Search
CPC .... G06F 40/169; G06F 40/126; G06F 40/194; G06F 40/279; G06F 40/253; G06F 40/284; G06F 16/3329; G06F 16/34; G06F 16/35
See application file for complete search history.

(56) References Cited

U.S. PATENT DOCUMENTS

2002/0163500 A1 11/2002 Griffith
2022/0027577 A1* 1/2022 Duan ...................... G06F 40/30
2022/0113793 A1* 4/2022 Wang ...................... G06F 3/011

FOREIGN PATENT DOCUMENTS

CN 104750705 A 7/2015
CN 111984767 * 11/2020
(Continued)

OTHER PUBLICATIONS

Communication from Chinese Patent Office dated Jul. 15, 2025 in Application No. 202210904173.0.
(Continued)

*Primary Examiner* — Cao H Nguyen
(74) *Attorney, Agent, or Firm* — Sughrue Mion, PLLC

(57) ABSTRACT

A reply content processing method including obtaining to-be-replied interactive content for media content, performing encoding processing on description content of the media content and the to-be-replied interactive content to obtain a vectorized representation of each word in the description content and the to-be-replied interactive content, and performing style recognition based on the vectorized representation of each word in the description content and the to-be-replied interactive content to obtain a first style category set, performing style recognition based on release party information of the to-be-replied interactive content to obtain a second style category set, determining a third style category set to which the to-be-replied interactive content belongs, determining a style category vector corresponding to each style category in the third style category set, and performing reply word prediction based on the description content, the to-be-replied interactive content, and the style category vector to generate reply content corresponding to each style category.

20 Claims, 16 Drawing Sheets

(51) Int. Cl.
*G06F 40/194* (2020.01)
*G06F 40/279* (2020.01)

(56) References Cited

FOREIGN PATENT DOCUMENTS

| | | | | |
|---|---|---|---|---|
| CN | 111984767 | A | | 11/2020 |
| CN | 112434140 | A | | 3/2021 |
| CN | 113037932 | A | | 6/2021 |
| CN | 113326018 | A | | 8/2021 |
| CN | 11459671 | A | * | 6/2022 |
| CN | 114595671 | A | | 6/2022 |
| CN | 115186085 | A | | 10/2022 |

OTHER PUBLICATIONS

International Search Report for PCT/CN2023/088099 dated Jun. 23, 2023.
Written Opinion for PCT/CN2023/088099 dated Jun. 23, 2023.

* cited by examiner

REPLY CONTENT PROCESSING METHOD AND INTERACTION METHOD FOR INTERACTIVE CONTENT OF MEDIA CONTENT

CROSS-REFERENCE RELATED APPLICATIONS

This application is a continuation application of International Application No. PCT/CN2023/088099 filed on Apr. 13, 2023, which claims priority to Chinese Patent Application No. 202210904173.0, filed with the China National Intellectual Property Administration on Jul. 28, 2022, the disclosures of each being incorporated by reference herein in their entireties.

FIELD

The disclosure relates to the field of artificial intelligence technology, and in particular, to a reply content processing method and apparatus, a computer device, a storage medium, and a computer program product, as well as an interaction method and apparatus for interactive content of media content, a computer device, a storage medium, and a computer program product.

BACKGROUND

With the development of computer technologies, more interactive content of media content is released. Common interactive content includes comments, barrages, and the like. For released interactive content, an object browsing the media content can reply to the released interactive content, to implement discussion interaction.

In the related art, a manner of replying to the released interactive content is that the object browsing the media content enters reply content to reply to the released interactive content. However, there is a problem of low reply efficiency because the object browsing the media content needs to actively enter the reply content to reply.

SUMMARY

According to various embodiments a reply content processing method and apparatus, a computer device, a computer-readable storage medium, and a computer program product, as well as an interaction method and apparatus for interactive content of media content, a computer device, a computer-readable storage medium, and a computer program product are provided.

Some embodiments provide a reply content processing method, performed by a computer device, including: obtaining to-be-replied interactive content for media content; performing encoding processing on description content of the media content and the to-be-replied interactive content to obtain a vectorized representation of each word in the description content and the to-be-replied interactive content, and performing style recognition based on the vectorized representation of each word in the description content and the to-be-replied interactive content to obtain a first style category set to which the to-be-replied interactive content belongs; performing style recognition based on release party information of the to-be-replied interactive content to obtain a second style category set to which the release party information belongs; determining, according to the first style category set and the second style category set, a third style category set to which the to-be-replied interactive content belongs; determining a style category vector corresponding to each style category in the third style category set; and performing reply word prediction based on the description content, the to-be-replied interactive content, and the style category vector to generate reply content corresponding to each style category.

Some embodiments provide a reply content processing apparatus. The apparatus includes: at least one memory configured to store program code; and at least one processor configured to read the program code and operate as instructed by the program code, the program code comprising: interactive content obtaining code configured to cause at least one of the at least one processor to obtain to-be-replied interactive content for media content; first style recognition code configured to cause at least one of the at least one processor to perform encoding processing on description content of the media content and the to-be-replied interactive content to obtain a vectorized representation of each word in the description content and the to-be-replied interactive content, and perform style recognition based on the vectorized representation of each word in the description content and the to-be-replied interactive content to obtain a first style category set to which the to-be-replied interactive content belongs; second style recognition code configured to cause at least one of the at least one processor to perform style recognition based on release party information of the to-be-replied interactive content to obtain a second style category set to which the release party information belongs; style distribution determining code configured to cause at least one of the at least one processor to determine, according to the first style category set and the second style category set, a third style category set to which the to-be-replied interactive content belongs; style category vector determining code configured to cause at least one of the at least one processor to determine a style category vector corresponding to each style category in the third style category set; and reply content generation code configured to cause at least one of the at least one processor to perform reply word prediction based on the description content, the to-be-replied interactive content, and the style category vector to generate reply content corresponding to each style category.

Some embodiments provide a non-transitory computer-readable storage medium storing computer code which, when executed by at least one processor, causes the at least one processor to at least: obtain to-be-replied interactive content for media content; perform encoding processing on description content of the media content and the to-be-replied interactive content to obtain a vectorized representation of each word in the description content and the to-be-replied interactive content, and perform style recognition based on the vectorized representation of each word in the description content and the to-be-replied interactive content to obtain a first style category set to which the to-be-replied interactive content belongs; perform style recognition based on release party information of the to-be-replied interactive content to obtain a second style category set to which the release party information belongs; determine, according to the first style category set and the second style category set, a third style category set to which the to-be-replied interactive content belongs; determine a style category vector corresponding to each style category in the third style category set; and perform reply word prediction based on the description content, the to-be-replied interactive content, and the style category vector to generate reply content corresponding to each style category.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following description, the term "some embodiments" describes subsets of all possible embodiments, but it may be understood that "some embodiments" may be the same subset or different subsets of all the possible embodiments, and can be combined with each other without conflict.

Figure 1:
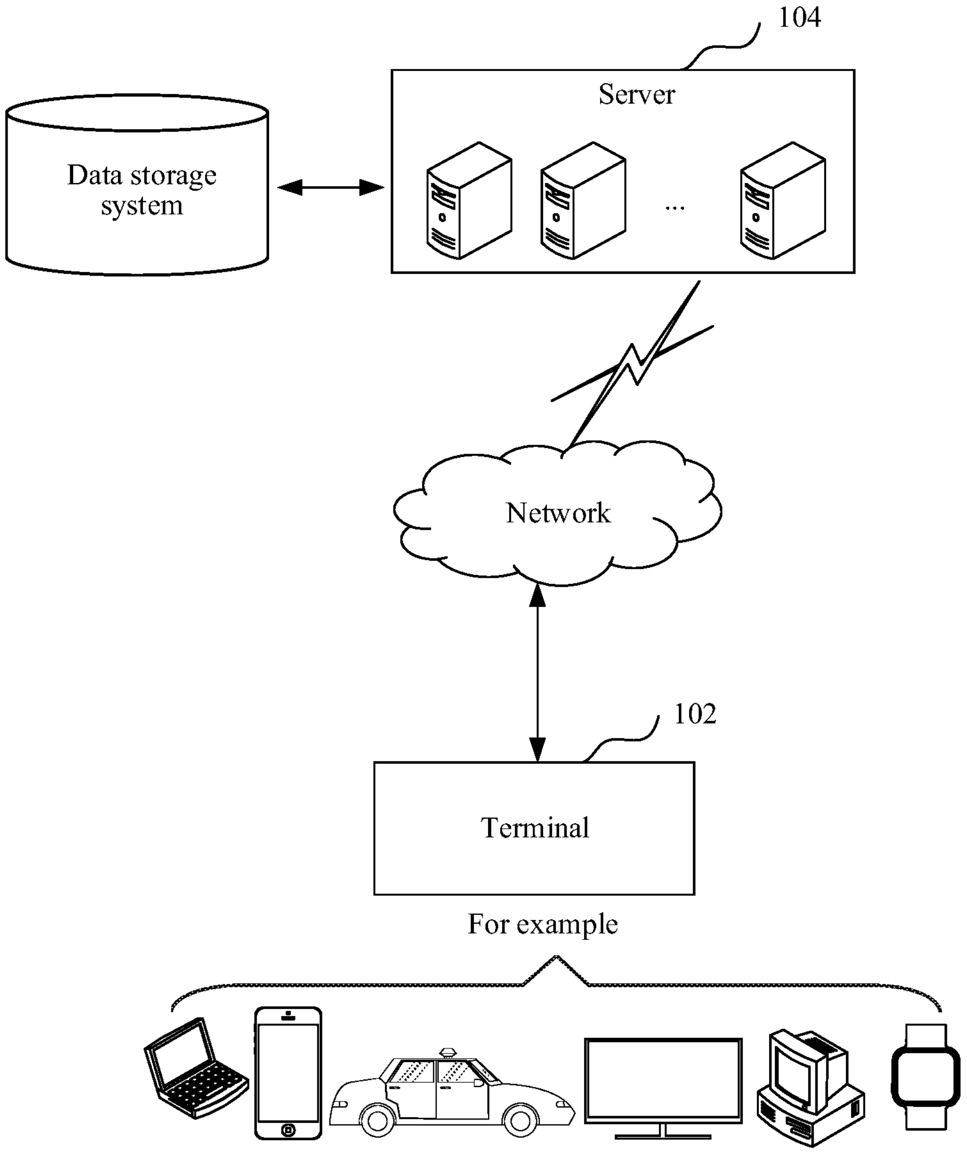
FIG. 1 is a diagram of an application environment of a reply content processing method according to some embodiments.

A reply content processing method provided in embodiments of this application may be applied to an application environment shown in FIG. 1. A terminal 102 communicates with a server 104 through a network. A data storage system may store data that the server 104 needs to process. The data storage system may be integrated on the server 104, or placed on the cloud or other servers. The server 104 obtains to-be-replied interactive content for media content from the terminal 102, performs encoding processing on description content of the media content and the to-be-replied interactive content, to obtain a vectorized representation of each word in the description content and the to-be-replied interactive content, performs style recognition based on the vectorized representation of each word in the description content and the to-be-replied interactive content, to obtain a first style category set to which the to-be-replied interactive content belongs, performs style recognition based on release party information of the to-be-replied interactive content, to obtain a second style category set to which the release party information belongs, determines, according to the first style category set and the second style category set, a third style category set to which the to-be-replied interactive content belongs, determines a style category vector corresponding to each style category in the third style category set, and performs reply word prediction based on the description content, the to-be-replied interactive content, and the style category vector, to generate reply content corresponding to each style category. The terminal 102 may be, but is not limited to, various desktop computers, laptops, smartphones, tablets, internet of things devices, portable wearable devices, and aircrafts. The internet of things devices may be a smart speaker, a smart television, a smart air conditioner, a smart vehicle-mounted device, and the like. The portable wearable devices may be a smart watch, a smart bracelet, a head-mounted device, and the like. The server 104 may be implemented by using an independent server or a server cluster that includes a plurality of servers or a cloud server, and may also be a node on the blockchain.

Figure 2:
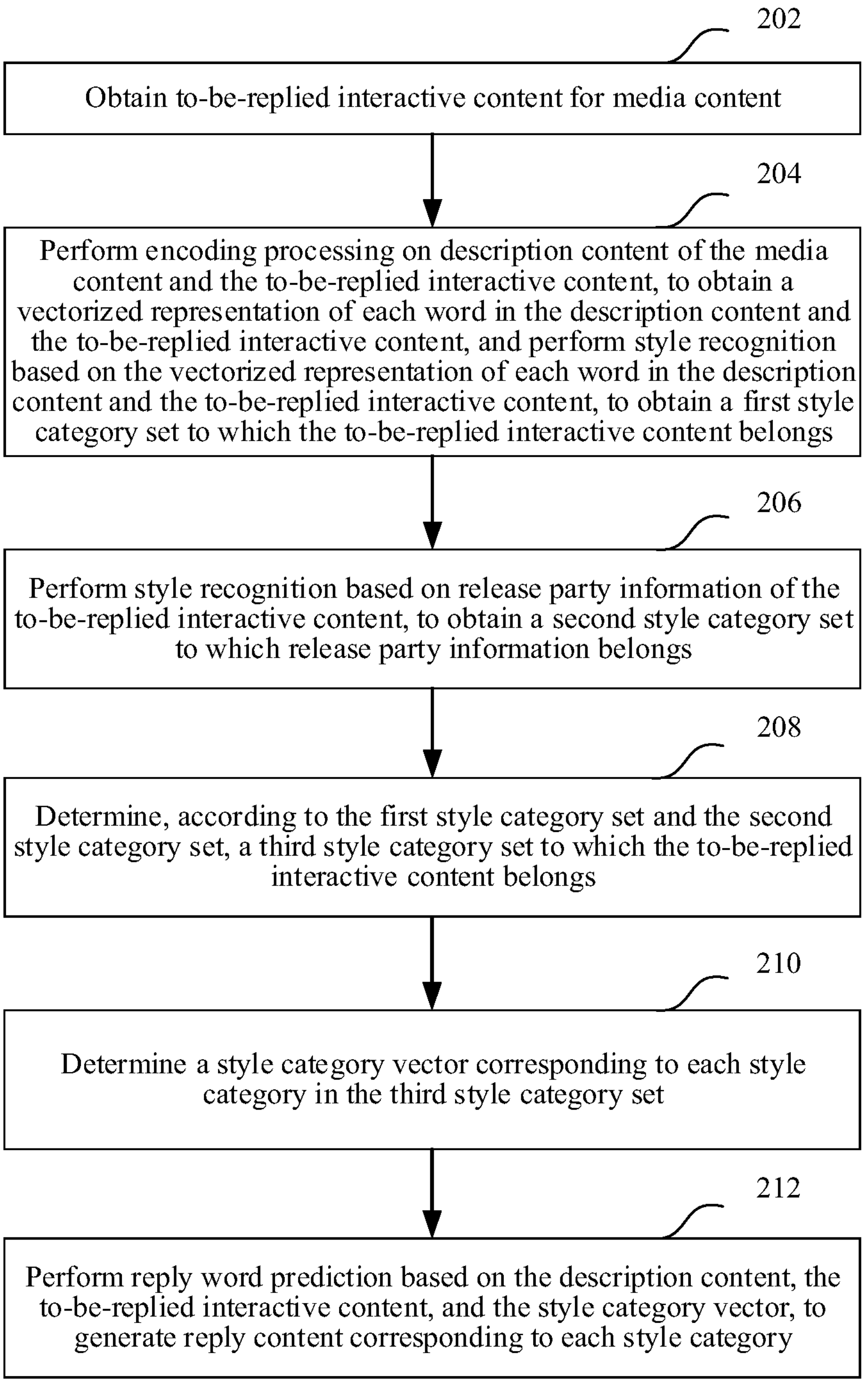
FIG. 2 is a schematic flowchart of a reply content processing method according to some embodiments.

In some embodiments, as shown in FIG. 2, a reply content processing method is provided. The method may be independently performed by the terminal or the server, or may be collaboratively performed by the terminal and the server. In embodiments of this application, description is provided by using an example in which the method is performed by the server, including the following operations:

Operation 202: Obtain to-be-replied interactive content for media content.

The media content refers to media data released to a public platform or an application. For example, the media content may refer to video data released to a public platform or an application. For example, the media content may refer to audio data released to a public platform or an application. The public platform is a platform that is public and may be browsed. For example, the public platform may refer to a video website. For example, the public platform may refer to an audio website. The application refers to a program that may be configured to release the media content. For example, the application may refer to an audio application configured to release the media content. For example, the application may refer to a video application configured to release the media content.

The to-be-replied interactive content refers to interactive content that needs to be replied. The interactive content refers to content released by an object browsing the media content and represents views of the object on the media content. For example, the interactive content may refer to comments released by the object browsing the media content. For example, the interactive content may refer to barrages released by the object browsing the media content.

In some embodiments, when performing reply content processing, the server obtains the to-be-replied interactive content for the media content. In some embodiments, the server obtains the to-be-replied interactive content for the media content in response to a selection event of any interactive content of the media content. In some embodiments, the terminal displays the interactive content of the media content. In response to a trigger event for any interactive content, after determining the to-be-replied interactive content, the terminal sends the to-be-replied interactive content to the server, so that the server obtains the to-be-replied interactive content for the media content.

Operation 204: Perform encoding processing on description content of the media content and the to-be-replied interactive content, to obtain a vectorized representation of each word in the description content and the to-be-replied interactive content, and perform style recognition based on the vectorized representation of each word in the description content and the to-be-replied interactive content, to obtain a first style category set to which the to-be-replied interactive content belongs.

The description content refers to content configured for describing the media content. For example, the description content may refer to content extracted based on the media content. For example, the description content may be a subtitle extracted based on the media content. For example, the description content may refer to content extracted based on the interactive content of the media content. For example, the description content may refer to keywords that are extracted based on the interactive content of the media content, and the interactive content may be barrages, comments, and the like.

A style refers to a comprehensive overall characteristic expressed in literary creation. In some embodiments, the style mainly refers to a language style. Style recognition refers to analyzing a style category of a style recognition object, and recognizing style distribution of the style recognition object. Style category refer to a category of a language style, and the style category may be configured according to an actual application scenario. For example, the style category may be divided into a philosophy category, a comedy category, a spoof category, a poetry category, and the like. Style distribution is configured for describing the distribution of the style category. The style distribution includes at least a style category set to which the style recognition object belongs. For example, when the style distribution includes the style category set to which the style recognition object belongs, the style distribution may be in the form of [a comedy style, a philosophy style, and a poetry style]. In other words, the style recognition object belongs to the comedy style, the philosophy style, and the poetry style. In some embodiments, the style distribution may further include a style category probability corresponding to each style category in the style category set. For example, when the style distribution includes a style category set and the style category probability corresponding to each style category in the style category set, the style distribution may be in the form of [a comedy style of 0.55, a philosophy style of 0.3, and a poetry style of 0.15]. 0.55, 0.3, and 0.15 are style category probabilities corresponding to the comedy style, the philosophy style, and the poetry style respectively.

In some embodiments, the server performs encoding processing on description content of the media content and the to-be-replied interactive content, to obtain a vectorized representation of each word in the description content and the to-be-replied interactive content, and fuses the description content and the vectorized representation of each word in the to-be-replied interactive content, to obtain a first style category set to which the to-be-replied interactive content belongs based on a first fused vector representation. The first style category set may be referred to as a first style distribution, and is configured to describe the distribution of the style category of the to-be-replied interactive content based on the description content. In some embodiments, when obtaining the first style category set, the server also obtains the style category probability that the to-be-replied interactive content belongs to each style category in the first style category set.

In some embodiments, when performing encoding processing on description content of the media content and the to-be-replied interactive content, the server performs word segmentation on the description content and the to-be-replied interactive content, to obtain a word set, and then performs encoding processing on each word in the word set, to obtain a vectorized representation of each word in the description content and the to-be-replied interactive content. The vectorized representation may also be referred to as the description content of the media content and a target vector representation corresponding to the to-be-replied interactive content.

In some embodiments, when performing encoding processing on each word in the word set, to obtain the vectorized representation of each word in the description content and the to-be-replied interactive content, the server first serializes each word in the word set, to obtain a serialized representation corresponding to each word, and then performs encoding processing on the serialized representation corresponding to each word, to obtain the vectorized representation of each word in the description content and the to-be-replied interactive content.

In some embodiments, the server performs pooling operation on the vectorized representation of each word in the description content and the to-be-replied interactive content, fuses vectors obtained after pooling, and performs style classification based on a first fused vector representation, to obtain the first style category set. The pooling operation may be a maximum pooling operation, an average value pooling operation, and the like. In some embodiments, the pooling operation is not limited. The maximum pooling refers to taking a point with a greatest value in a local receptive domain, and the average value pooling refers to averaging all the values in the local receptive domain.

In some embodiments, the server may perform style recognition based on the pre-trained interactive content style recognition model, to obtain the first style category set. In other words, by inputting the description content of the media content and the to-be-replied interactive content into the pre-trained interactive content style recognition model, to obtain the first style category set. The pre-trained interactive content style recognition model may be obtained through performing supervised training on an interactive content data set labeled with the style category. For example, a format of the interactive content data set labeled with the style category may be in the form of [media content 1 interactive content 1 interactive content 1 style interactive content reply 1 interactive content reply 1 style . . . ].

Figure 3:
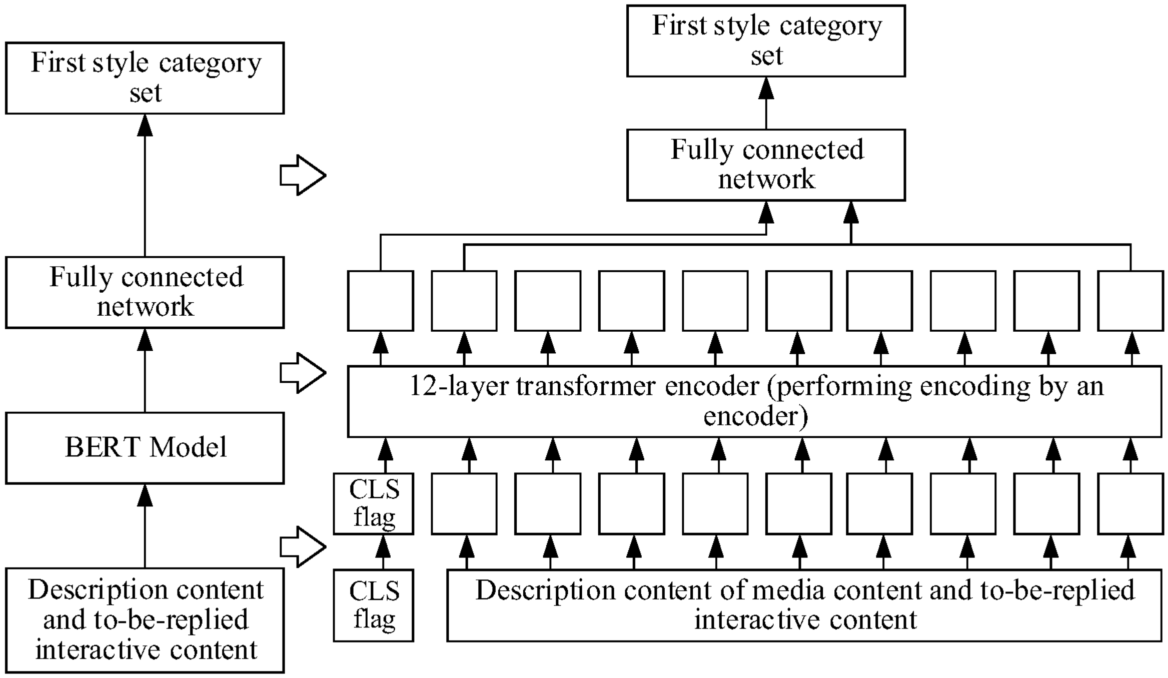
FIG. 3 is a schematic diagram of an interactive content style recognition model according to some embodiments.

In some embodiments, the specific interactive content style recognition model is not limited herein, provided that interactive content style recognition may be implemented. For example, as shown in FIG. 3, the pre-trained interactive content style recognition model may be a model based on a BERT model. When performing style recognition, encoding is performed on a CLS flag, the description content of the media content, and the to-be-replied interactive content through the BERT model (including a transformer encoder (performing encoding by an encoder), which may be performing encoding by a 12-layer encoder), to obtain a vector representation corresponding to the CLS flag, the description content, and the vectorized representation of each word in the to-be-replied interactive content. Then, the vector representation corresponding to the CLS flag, the description content, and the vectorized representation of each word in the to-be-replied interactive content are fused through a fully connected layer, and the first fused vector representation is passed through a classification output layer, to obtain the first style category set.

When encoding is performed on the CLS flag, the description content of the media content, and the to-be-replied interactive content through the BERT model, word segmentation is first performed on the description content of the media content and the to-be-replied interactive content, to obtain a word set corresponding to the description content and the to-be-replied interactive content. Each word in the corresponding word set is serialized, to obtain a serialized representation corresponding to each word, and then encoding processing is performed on the serialized representation corresponding to each word.

When the vector representation corresponding to the CLS flag, the description content, and the vectorized representation of each word in the to-be-replied interactive content are fused, it may be that maximum pooling of the vector representation corresponding to the CLS flag, the description content, and the vectorized representation of each word in the to-be-replied interactive content is fused, that is, pooling is first performed and then fusing is performed. As shown in FIG. 3, the CLS flag is placed first, and the vector representation corresponding to the CLS flag obtained through the BERT model may be configured for subsequent classification tasks.

In some embodiments, before performing style recognition, the server needs to obtain the description content of the media content. In some embodiments, the server may extract key content from the media content in manner such as optical character recognition, automatic speech recognition, and the like, and use the key content extracted from the media content as the description content of the media content. In another specific application, the server may extract keywords from the interactive content of the media content, to obtain the keywords corresponding to the interactive content of the media content, and use the keywords corresponding to the interactive content as the description content of the media content. In some embodiments, the server may further use the key content extracted from the media content and the keywords corresponding to the interactive content as the description content of the media content.

When the media content is a video, the server may obtain a video frame corresponding to the video by performing video frame extracting on the video, obtain a video subtitle through optical character recognition, and use the video subtitle as the key content extracted from the media content. In addition, the server may further obtain a dialog text corresponding to the video by performing automatic speech recognition on the video, and use the dialog text as the key content extracted from the media content. The dialog text refers to words spoken by an object appearing in the video. For example, when the video is a clip from a film or television drama, the dialog text may refer to lines spoken by an actor appearing in the clip from the film or television drama. In some embodiments, the server may further simultaneously use the video subtitle and the dialog text as the key content extracted from the media content.

A manner of keyword extraction is not limited herein. For example, keyword extraction may be performed based on a term frequency/inverse document frequency (TF-IDF) algorithm. For example, keyword extraction may be performed based on a textrank algorithm.

Operation 206: Perform style recognition based on release party information of the to-be-replied interactive content, to obtain a second style category set to which the release party information belongs.

The release party information refers to personal information of a release party who releases the to-be-replied comment content, and may be configured for determining a style distribution of the release party who releases the to-be-replied comment content. For example, the release party information may refer to historical interactive content released by the release party who releases the to-be-replied comment content.

In some embodiments, the server performs style recognition based on the release party information of the to-be-replied interactive content, to obtain a second style category set to which the release party information belongs. The second style category set may also be referred to as a second style distribution, and is configured to describe the distribution of the style category of the release party of the to-be-replied interactive content.

In some embodiments, the second style category set may be in the form of [a comedy style, a spoof style, and a poetry style]. In some embodiments, when obtaining the second style category set, the server also obtains the style category probability that the release party information belongs to each style category in the second style category set.

Operation 208: Determine, according to the first style category set and the second style category set, a third style category set to which the to-be-replied interactive content belongs.

In some embodiments, the server comprehensively considers the first style category set and the second style category set, to determine the third style category set to which the to-be-replied interactive content belongs. The third style category set to which the to-be-replied interactive content belongs may be referred to as the style distribution of the to-be-replied interactive content. The style distribution of the to-be-replied interactive content is configured for describing the distribution of style category of the to-be-replied interactive content based on simultaneously considering the description content, the to-be-replied interactive content, and the release party information.

In some embodiments, the server uses each style category in the first style category set and the second style category set as the style category corresponding to the to-be-replied interactive content, and determines the third style category set to which the to-be-replied interactive content belongs. For example, if the first style category set is [a philosophy style, a comedy style, and a spoof style], and the second style category set is [a comedy style, a spoof style, and a poetry style], the third style category set to which the determined to-be-replied interactive content belongs is [a philosophy style, a comedy style, a spoof style, and a poetry style].

In some embodiments, when obtaining the first style category set, the server also obtains the style category probability that the to-be-replied interactive content belongs to each style category in the first style category set. When obtaining the second style category set, the server also obtains the style category probability that the release party information belongs to each style category in the second style category set. Based on this, the server may determine the style category probability of each style category in the third style category set according to the style category probability of each style category in the first style category set and the second style category set. In some embodiments, the server performs weighted averaging on the style category probability of each style category in the first style category set and the second style category set, to obtain the style category probability of each style category in the third style category set. For example, if the style category probability of each style category in the first style category set is [a philosophy style of 0.6, a comedy style of 0.2, and a spoof style of 0.2], and the style category probability of each style category in the second style category set is [a comedy style of 0.4, a spoof style of 0.4, and a poetry style 0.2], the style category probability of each style category in the third style category set is [a philosophy style of 0.3, a comedy style of 0.3, a spoof style of 0.3, and a poetry style of 0.1].

Operation 210: Determine a style category vector corresponding to each style category in the third style category set.

The style category vector refers to a vector configured for describing the style category. Different style categories correspond to different style category vectors.

In some embodiments, after obtaining the third style category set of the to-be-replied interactive content, the server determines the style category vector corresponding to each style category in the third style category set of the to-be-replied interactive content. In some embodiments, the server may determine the style category vector corresponding to each style category in the third style category set by querying a preset style category vector table. The preset style category vector table is pre-configured with a corresponding relationship between the style category and the style category vector. The server may further directly encode each style category in the third style category set, to obtain the style category vector corresponding to each style category in the third style category set.

In some embodiments, the server may encode each style category in the third style category set through a pre-trained language representation model, to obtain the style category vector corresponding to each style category in the third style category set. The pre-trained language representation model may be selected and pre-trained according to an actual application scenario. For example, the pre-trained language representation model may be a bidirectional encoder representation from transformer (BERT) model.

Operation 212: Perform reply word prediction based on the description content, the to-be-replied interactive content, and the style category vector, to generate reply content corresponding to each style category.

In some embodiments, the server performs word segmentation and vectorization processing on the description content and the to-be-replied interactive content, to obtain the vectorized representation of each word in the description content and the to-be-replied interactive content, and performs reply word prediction based on the vectorized representation of each word and the style category vector, to generate the reply content corresponding to each style category. In some embodiments, the server first performs, targeting each style category, reply word prediction based on the vectorized representation of each word and the style category vector of the targeted style category, to obtain at least one predicted reply word corresponding to the targeted style category, and generates, based on at least one predicted reply word corresponding to the targeted style category, the reply content corresponding to the targeted style category.

In some embodiments, when performing reply word prediction based on the vectorized representation of each word and the style category vector of the targeted style category, to generate the predicted reply word, the server selects, based on a copy mechanism, to generate the predicted reply word from a preset word list or directly copies a word as a predicted reply word from each word of the description content and the to-be-replied interactive content. The copy mechanism selects, based on a maximum probability, to generate a predicted reply word or directly copies a word as a predicted reply word. In other words, the server calculates a probability of each word as a predicted reply word and a probability of each candidate word in the preset word list as a predicted reply word. Based on the two probabilities, the copy mechanism selects to generate a predicted reply word or directly copies a word as a predicted reply word.

In addition, the copy mechanism further relates to a simple restriction rule. If a probability of each word of the description content and the to-be-replied interactive content used as a predicted reply word is less than a first threshold, it is definitely not copy. If a probability of any word used as a predicted reply word among each word of the description content and the to-be-replied interactive content is greater than or equal to the first threshold, and a probability of each candidate word in the preset word list used as a predicted reply word is less than a second threshold, it is definitely copy. In some embodiments, what is input is the vectorized representation of each word. The first threshold and the second threshold may be configured according to an actual application scenario, and may be the same or different. For example, both the first threshold and the second threshold may be 0.

In some embodiments, when obtaining the third style category set, the server also obtains the style category probability that the to-be-replied interactive content belongs to each style category in the third style category set. When generating reply content corresponding to each style category in the third style category set, the server selects a style category in which the reply content needs to be generated based on the style category probability corresponding to each style category in the third style category set, to be specific, generates corresponding reply content for a style category whose style category probability meets a category probability threshold. The category probability threshold may be configured according to an actual application scenario. In this way, calculation resources may be saved when generating reply content corresponding to each style category in the third style category set.

In the reply content processing method, to-be-replied interactive content for media content is obtained, encoding processing is performed on description content of the media content and the to-be-replied interactive content, to obtain a vectorized representation of each word in the description content and the to-be-replied interactive content, style recognition is performed based on the vectorized representation of each word in the description content and the to-be-replied interactive content, to obtain a first style category set to which the to-be-replied interactive content belongs, style recognition is performed based on release party information of the to-be-replied interactive content, to obtain a second style category set to which the release party information belongs, a third style category set to which the to-be-replied interactive content belongs may be determined according to the first style category set and the second style category set, the style category of the to-be-replied interactive content may be determined by simultaneously considering the description content of the media content, the to-be-replied interactive content, and the style category of the release party information of the to-be-replied interactive content, which may improve accuracy of style recognition, and implement accurate recognition of the third style category set of the to-be-replied interactive content, so that a style category vector corresponding to each style category in the third style category set may be determined, and reply word prediction is performed based on the description content, the to-be-replied interactive content, and the style category vector, to generate reply content corresponding to each style category. By automatically generating the reply content corresponding to each style category as selection for interactive content, the reply content does not need to be entered for replying, which may improve reply efficiency.

In some embodiments, the release party information includes at least one piece of historical interactive content of a release party, and the performing style recognition based on release party information of the to-be-replied interactive content, to obtain a second style category set to which the release party information belongs includes:

performing style recognition on the at least one piece of historical interactive content, to obtain a historical style category set respectively corresponding to the at least one piece of historical interactive content and a style category probability of each historical style category in the historical style category set; and performing weighted averaging on the style category probability of each historical style category, to obtain the second style category set to which the release party information belongs.

The historical interactive content refers to interactive content released by the release party in the past. For example, the historical interactive content may be the comment released by the release party in the past. For example, the historical interactive content may be barrages released by the release party in the past.

In some embodiments, when performing style recognition on the at least one piece of historical interactive content, the server performs encoding processing on the at least one piece of historical interactive content, to obtain the vector representation corresponding to the at least one piece of historical interactive content, obtains, based on the vector representation corresponding to the at least one piece of historical interactive content, a historical style category set respectively corresponding to the at least one piece of historical interactive content and a style category probability of each historical style category in the historical style category set, and performs weighted averaging on the style category probability of each historical style category, to obtain the second style category set to which the release party information belongs. The historical style category set and the style category probability of each historical style category in the historical style category set may also be referred to as a historical style distribution, which is configured to describe the distribution of the style category of the historical interactive content.

In some embodiments, for each piece of historical interactive content in the at least one piece of historical interactive content, the server performs word segmentation on the targeted historical interactive content, to obtain the word set corresponding to the targeted historical interactive content, then performs encoding processing on each word in the word set, to obtain a vector representation corresponding to each word, and uses the vector representation corresponding to each word as the vector representation corresponding to the targeted historical interactive content. In some embodiments, the server first serializes each word in the word set, to obtain a serialized representation corresponding to each word, and then performs encoding processing on the serialized representation corresponding to each word, to obtain the vector representation corresponding to each word.

In some embodiments, the server fuses the vector representation corresponding to each word in the vector representation corresponding to the targeted historical interactive content, and performs style classification based on the second fused vector representation, to obtain a historical style category set corresponding to the targeted historical interactive content and a style category probability of each historical style category in the historical style category set. In some embodiments, the server first performs pooling operation on the vector representation corresponding to each word in the vector representation, and then fuse the vectors obtained after pooling. The pooling operation may be a maximum pooling operation, an average value pooling operation, and the like. In some embodiments, the pooling operation is not limited In some embodiments, for each piece of historical interactive content in at least one piece of historical interactive content, the server may perform style recognition based on the pre-trained interactive content style recognition model, to obtain the historical style category set corresponding to the targeted historical interactive content and the style category probability of each historical style category in the historical style category set, to be specific, by inputting the targeted historical interactive content into the pre-trained interactive content style recognition model, obtain the historical style category set corresponding to the targeted historical interactive content and the style category probability of each historical style category in the historical style category set. The pre-trained interactive content style recognition model may be obtained through performing supervised training on an interactive content data set labeled with the style category. For example, a format of the interactive content data set labeled with the style category may be in the form of [media content 1 interactive content 1 interactive content 1 style interactive content reply 1 interactive content reply 1 style . . . ].

Figure 4:
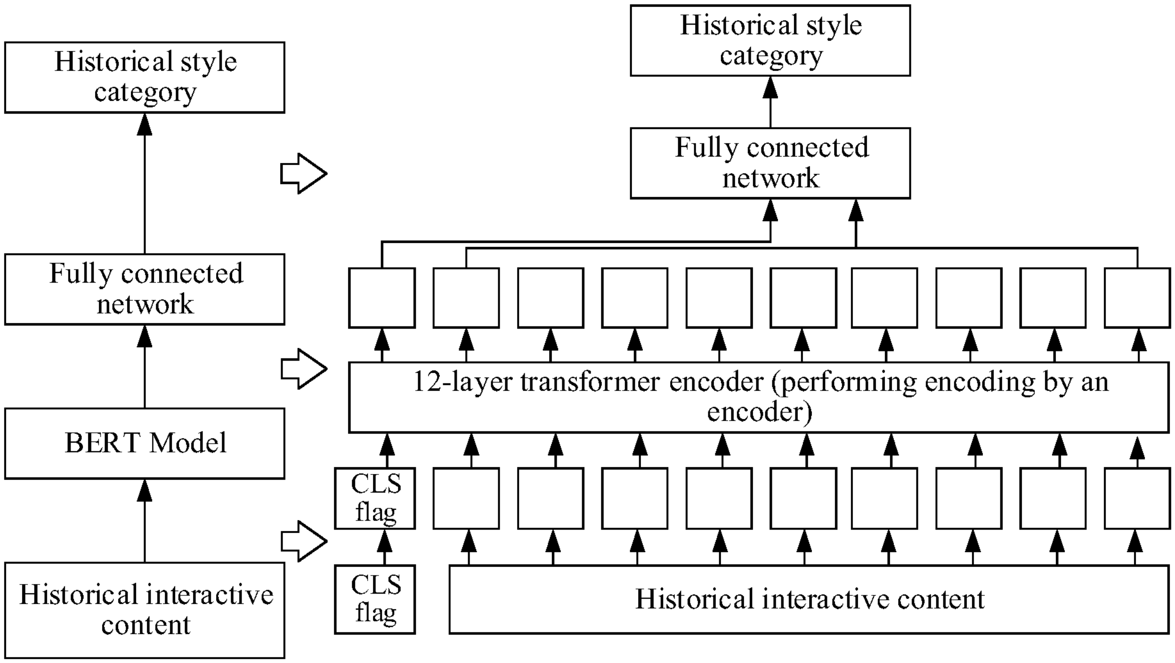
FIG. 4 is a schematic diagram of an interactive content style recognition model according to some embodiments.

In some embodiments, the specific interactive content style recognition model is not limited herein, provided that interactive content style recognition may be implemented. For example, as shown in FIG. 4, the pre-trained interactive content style recognition model may be a model based on a BERT model. When performing style recognition, encoding is performed on a CLS flag and the historical interactive content through the BERT model (including a transformer encoder (performing encoding by an encoder), which may be performing encoding by a 12-layer encoder), to obtain a vector representation corresponding to the CLS flag and the vector representation corresponding to the historical interactive content. Then, the vector representation corresponding to the CLS flag and the vector representation corresponding to the historical interactive content are fused through a fully connected layer, and the second fused vector representation is passed through a classification output layer, to obtain the historical style category set corresponding to the historical interactive content and the style category probability of each historical style category in the historical style category set, to be specific, the historical style distribution.

When encoding is performed on the CLS flag and historical interactive content through the BERT model, word segmentation is first performed on the historical interactive content, to obtain a word set corresponding to the historical interactive content, and each word in the word set corresponding to the historical interactive content is serialized, to obtain a serialized representation corresponding to each word, and then encoding processing is performed on the serialized representation corresponding to each word. When the vector representation corresponding to the CLS flag and the vector representation corresponding to the historical interactive content are fused, it may be that maximum pooling of the vector representation corresponding to the CLS flag and the vector representation of the historical interactive content is fused, that is, pooling is first performed and then fusing is performed. As shown in FIG. 4, the CLS flag is placed first, and the vector representation corresponding to the CLS flag obtained through the BERT model may be configured for subsequent classification tasks.

In some embodiments, by performing style recognition on the at least one piece of historical interactive content, a historical style category set respectively corresponding to the at least one piece of historical interactive content and a style category probability of each historical style category in the historical style category set may be obtained, and then the style distribution of the release party may be constructed by performing weighted averaging on the style category probability of each historical style category, to determine the second style category set to which the release party information belongs.

In some embodiments, the reply content processing method further includes:

- obtaining similar interactive content of the to-be-replied interactive content from interactive content of the media content; and
- the performing reply word prediction based on the description content, the to-be-replied interactive content, and the style category vector, to generate reply content corresponding to each style category includes:
- performing reply word prediction based on the description content, the to-be-replied interactive content, the similar interactive content, and the style category vector, to generate the reply content corresponding to each style category.

The similar interactive content refers to interactive content in the media content that is similar to the interactive content.

In some embodiments, the server obtains the similar interactive content of the to-be-replied interactive content from the interactive content of the media content based on the interactive content of the media content, the sixth style category set of the interactive content, the to-be-replied interactive content, and the third style category set of the to-be-replied interactive content, performs reply word prediction based on the description content, the to-be-replied interactive content, and the style category vector, to obtain at least one predicted reply word corresponding to each style category, and generates, based on the at least one predicted reply word corresponding to each style category, the reply content corresponding to each style category. In some embodiments, the server first performs style recognition on the interactive content of the media content, to obtain the sixth style category set of the interactive content. The sixth style category set of the interactive content may also be referred to as the style distribution of the interactive content. A manner of performing style recognition on the interactive content is similar to the manner of performing style recognition on the at least one piece of historical interactive content.

In some embodiments, by obtaining similar interactive content of the to-be-replied interactive content from the interactive content of the media content, the text for generating the reply content may be enriched and improved, and by performing reply word prediction based on the description content, the to-be-replied interactive content, the similar interactive content, and the style category vector, reply content corresponding to each style category is generated, which may improve generation quality.

In some embodiments, the obtaining similar interactive content of the to-be-replied interactive content from interactive content of the media content includes:

- separately obtaining a style similarity between the to-be-replied interactive content and each interactive content of the media content, and separately obtaining content similarity between the to-be-replied interactive content and each interactive content; and
- selecting the similar interactive content of the to-be-replied interactive content from the interactive content of the media content based on the style similarity and the content similarity that correspond to each interactive content.

The content similarity is configured for describing a degree of similarity between the to-be-replied interactive content and the interactive content of the media content. For example, the style similarity may refer to a degree of similarity between the style distribution of the to-be-replied interactive content and the style distribution of the interactive content of the media content. The content similarity is configured for describing the degree of similarity between the to-be-replied interactive content and the interactive content of the media content.

In some embodiments, based on the third style category set of the to-be-replied interactive content and the sixth style category set corresponding to each interactive content of the media content, the server separately obtains the style similarity between the to-be-replied interactive content and each interactive content of the media content, and separately obtains the content similarity between the to-be-replied interactive content and each interactive content, to perform weighted summation on the style similarity and the content similarity corresponding to each interactive content, and separately obtain the similarity between each interactive content and the to-be-replied interactive content, and according to the similarity between each interactive content and the to-be-replied interactive content, selects the interactive content whose similarity to the to-be-replied interactive content is greater than the similarity threshold from the interactive content of the media content as the similar interactive content of the to-be-replied interactive content. A weight coefficient and a similarity threshold that are assigned to the style similarity and the content similarity when performing weighted summation may be configured according to an actual application scenario.

In some embodiments, the server may obtain the style similarity corresponding to each interactive content by calculating the similarity between the third style category set of the to-be-replied interactive content and the sixth style category set corresponding to each interactive content of the media content. In some embodiments, the server may encode each style category in the third style category set, to obtain the style category vector corresponding to the third style category set, and encode each style category in the sixth style category set, to obtain the style category vector corresponding to the sixth style category set. The server calculates cosine similarity between the style category vector corresponding to the third style category set and the style category vector corresponding to the sixth style category set, and then obtains, based on the cosine similarity, the style similarity corresponding to each interactive content. For example, the style similarity may be (1−cosine similarity), namely, a difference between 1 and the cosine similarity.

In some embodiments, when separately obtaining the content similarity between the to-be-replied interactive content and each interactive content, the server may first calculate an editing distance between the to-be-replied interactive content and each interactive content, and then obtain, based on the editing distance, the to-be-replied interactive content, and a content length of each interactive content, the content similarity corresponding to each interactive content. The editing distance, also referred to as a Levenstein distance, is quantitative measurement of a degree of difference between two strings (such as English words). A measurement manner of the editing distance is to determine how many times of processing are required to turn one string into another string. In some embodiments, what is mainly involved is to determine how many times of processing are needed to turn the interactive content into the to-be-replied interactive content.

In some embodiments, the server determines, based on the to-be-replied interactive content and the content length of each interactive content, a maximum content length corresponding to each interactive content, for each interactive content, calculates a ratio of the editing distance between the to-be-replied interactive content and the interactive content to a maximum content length corresponding to the interactive content, and obtains the content similarity corresponding to the interactive content based on the ratio. For example, the content similarity may be (1−editing distance/maximum content length). The editing distance/maximum content length refers to the ratio of the editing distance to the maximum content length. The content similarity may be a difference between 1 and the ratio.

In some embodiments, by separately obtaining the style similarity and the content similarity between the to-be-replied interactive content and each interactive content of the media content, both style and content may be considered, to select similar interactive content of the to-be-replied interactive content from the interactive content of the media content.

In some embodiments, that reply content corresponding to at least one style category in the style distribution of the to-be-replied interactive content is generated based on the description content, the to-be-replied interactive content, the similar interactive content, and the style category vector includes:

- performing word segmentation on the description content, the to-be-replied interactive content, and the similar interactive content, to obtain a segmented word set;
- performing vectorization processing on each word in the segmented word set, to obtain a vectorized representation of each word in the segmented word set;
- performing reply word prediction based on the vectorized representation of each word in the segmented word set and the style category vector, to obtain at least one predicted reply word corresponding to each style category; and
- separately generating reply content corresponding to each style category based on the at least one predicted reply word corresponding to each style category.

In some embodiments, the server performs word segmentation on the description content, the to-be-replied interactive content, and similar interactive content, to obtain a segmented word set, then performs vectorization processing on each word in the word set through encoding, to obtain a vectorized representation of each word in the segmented word set, performs reply word prediction based on the vectorized representation of each word in the segmented word set and the style category vector, that is, based on the copy mechanism, selects to generate a reply word from a preset word list or directly copies a word from each word in the segmented word set as a predicted reply word, obtains the at least one predicted reply word corresponding to each style category, combines the at least one predicted reply word corresponding to each style category, and generates the reply content corresponding to each style category.

In some embodiments, when each predicted reply word is generated, the server determines a copy probability of each word in the segmented word set, and determines, based on the copy probability, whether to generate a reply word from the preset word list or directly copies a word from each word in the segmented word set as a predicted reply word, when a copy probability of each word in the segmented word set is less than a copy probability threshold, determines to generate a reply word from the preset word list, and when there is at least one target word in the segmented word set with a copy probability greater than or equal to the copy probability threshold, determines to directly copy a word from each word in the segmented word set as a predicted reply word. The copied word is a word with a highest copy probability among at least one target word.

In some embodiments, the server may generate reply content corresponding to each style category based on the pre-trained reply content generation model. The pre-trained reply content generation model may be obtained through performing supervised training on the interactive content data set labeled with the style category. In a training process, the style category vector uses a vector representation corresponding to the labeled style category. For example, a format of the interactive content data set labeled with the style category may be in the form of [media content 1 interactive content 1 interactive content 1 style interactive content reply 1 interactive content reply 1 style . . . ].

Figure 5:
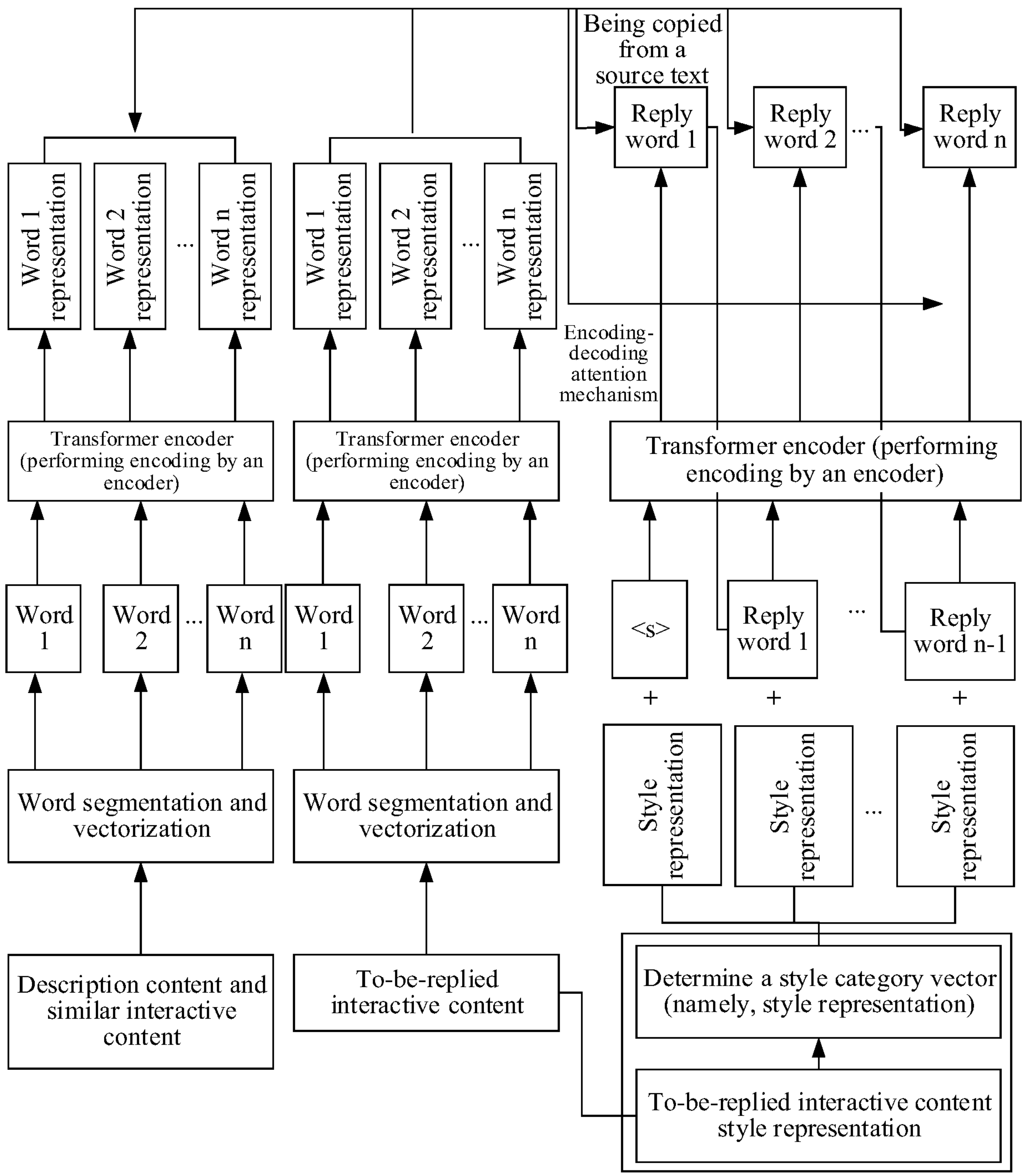
FIG. 5 is a schematic diagram of a reply content generation model according to some embodiments.

In some embodiments, the specific reply content generation model is not limited herein, provided that the reply content generation may be implemented. For example, as shown in FIG. 5, the pre-trained reply content generation model may be a model based on a transformer encoder (performing encoding by an encoder) and a transformer decoder (performing decoding by an encoder). Targeting each style category, when generating reply content, word segmentation is first performed on the description content, the to-be-replied interactive content, and the similar interactive content, to obtain a segmented word set, then vectorization processing is performed on each word in the word set through encoding, to obtain a vectorized representation of each word in the segmented word set, and then reply word prediction is performed based on the vectorized representation (that is, copied from a source text) of each word in the segmented word set and the style category vector (namely, style representation) of the targeted style category. In other words, based on the copy mechanism (namely, encoding-decoding attention mechanism), a reply word is selected to be generated from a preset word list or a word is directly copied from each word in the segmented word set as a predicted reply word, to obtain at least one predicted reply word corresponding to the targeted style category, and at least one predicted reply word corresponding to the targeted style category is combined, to generate reply content corresponding to the targeted style category.

When performing reply word prediction based on the vectorized representation of each word and the style category vector of the targeted style category, decoding is first performed on a style category vector and a start symbol (<S>) of the targeted style category in which the reply content needs to be generated. A reply word 1 is predicted based on the decoded vector and the vectorized representation of each word, and then decoding is performed on the style category vector and the reply word 1. A reply word 2 is predicted based on the decoded vector and the vectorized representation of each word. Until a prediction stop condition is met, the generated n predicted reply words are combined, to generate the reply content corresponding to the targeted style category. A minimum value of n is 1, and a maximum value may be configured according to an actual application scenario in the prediction stop condition.

In some embodiments, by performing word segmentation and vectorization on the description content, the to-be-replied interactive content, and the similar interactive content, the vectorized representation of each word in the description content, the to-be-replied interactive content, and the similar interactive content may be obtained. In this way, reply word prediction may be accurately performed based on the vectorized representation of each word and the style category vector, a generation effect of proprietary words related to the media content is improved, and at least one predicted reply word corresponding to each style category is obtained, to generate, based on at least one predicted reply word corresponding to each style category, reply content corresponding to each style category.

In some embodiments, the performing reply word prediction based on the vectorized representation of each word in the segmented word set and the style category vector, to obtain at least one predicted reply word corresponding to each style category includes:

performing, targeting each style category, reply word prediction based on the vectorized representation of each word in the segmented word set and a style category vector of the targeted style category, to obtain a current reply word corresponding to the targeted style category;

using, in a case that the reply word prediction meets a prediction stop condition, the current reply word as at least one predicted reply word corresponding to the targeted style category; and continuing to perform reply word prediction based on the vectorized representation of each word in the segmented word set, the style category vector of the targeted style category, and the current reply word in a case that the reply word prediction meets a prediction continuing condition, to obtain the at least one predicted reply word corresponding to the targeted style category.

The prediction stop condition refers to a condition for stopping reply word prediction, which may be configured according to an actual application scenario. For example, the prediction stop condition may be that a quantity of reply words generated by prediction reaches a reply word quantity threshold. The reply word quantity threshold may be configured according to the actual application scenario. For example, the prediction stop condition may be that both the copy probability of each word in the description content, the to-be-replied interactive content, and the similar interactive content and the word similarity of each candidate word in the preset word list are less than a preset reply word probability threshold. The preset reply word probability threshold may be configured according to the actual application scenario. For example, the prediction stop condition may be that a quantity of reply words generated by prediction reaches the reply word quantity threshold or both the copy probability of each word in the description content, the to-be-replied interactive content, and the similar interactive content and the word similarity of each candidate word in the preset word list are less than the preset reply word probability threshold. A prediction continuing condition refers to a condition for continuing to perform reply word prediction. When reply word prediction does not meet the prediction stop condition, it is considered that the prediction continuing condition is met.

In some embodiments, targeting each style category, the server performs reply word prediction based on the vectorized representation of each word in the segmented word set and the style category vector of the targeted style category, to first obtain a current reply word corresponding to the targeted style category, determine whether the current reply word prediction meets the prediction stop condition, and determines whether the current reply word prediction meets the prediction stop condition. When the reply word prediction meets the prediction stop condition, the server stops the reply word prediction, and uses the current reply word as at least one predicted reply word corresponding to the targeted style category. When the reply word prediction does not meet the prediction stop condition, the server considers that the reply word prediction meets the prediction continuing condition. Based on the vectorized representation of each word in the segmented word set, the style category vector of the targeted style category, and the current reply word, the server continues to perform reply word prediction, to obtain at least one predicted reply word corresponding to the targeted style category. In this case, a quantity of predicted reply words is at least two.

In some embodiments, by performing reply word prediction based on the vectorized representation of each word in the segmented word set and the style category vector of the targeted style category, the current reply word corresponding to the targeted style category may be obtained. Through the prediction stop condition and the prediction continuing condition, whether the reply word prediction stops may be determined, to obtain the at least one predicted reply word corresponding to the targeted style category.

In some embodiments, the performing reply word prediction based on the vectorized representation of each word in the segmented word set and a style category vector of the targeted style category, to obtain a current reply word corresponding to the targeted style category includes:

performing similarity calculation on the vectorized representation of each word in the segmented word set and the style category vector of the targeted style category, to obtain a copy probability corresponding to each word in the segmented word set;

in a case that there is at least one first word whose copy probability is greater than or equal to a copy probability threshold, obtaining, based on the at least one first word, the current reply word corresponding to the targeted style category; and obtaining the current reply word corresponding to the targeted style category from a preset word list in a case that the copy probability each is less than the copy probability threshold.

The copy probability is configured for representing a probability that each word is directly copied as the current reply word. The preset word list refers to a word list that is configured in advance according to an actual application scenario, and includes a vectorized representation of at least one candidate word.

In some embodiments, the server performs similarity calculation on the vectorized representation of each word in the segmented word set and the style category vector of the targeted style category, to obtain a copy probability corresponding to each word in the segmented word set, and compare a copy probability and a copy probability threshold that separately correspond to each word in the segmented word set. When there is at least one first word whose copy probability is greater than or equal to the copy probability threshold, it indicates that a word may be directly copied from at least one first word as the current reply word, and the copied word is a word with a highest copy probability among the at least one first word. When the copy probability is less than the copy probability threshold, it indicates that a reply word needs to be generated from the preset word list, and the server obtains the current reply word corresponding to the targeted style category from the preset word list.

In some embodiments, when a quantity of first words is 1, the first word may be directly copied as the current reply word. When a quantity of first words is at least 2, the copy probability of the first word needs to be compared, and the first word with the highest copy probability is selected as the current reply word.

In some embodiments, by performing similarity calculation on the vectorized representation of each word in the segmented word set and the style category vector of the targeted style category, the copy probability corresponding to each word may be obtained. Therefore, by comparing the copy probability and the copy probability threshold, it may be determined whether to generate a reply word from the preset word list or to directly copy a word from each word in the segmented word set as the current reply word. The current reply word is generated based on the copy mechanism.

In some embodiments, the preset word list includes a vectorized representation of at least one candidate word, and the obtaining the current reply word corresponding to the targeted style category from a preset word list in a case that the copy probability each is less than the copy probability threshold includes:

performing similarity calculation on the vectorized representation of each candidate word in the preset word list and the style category vector of the targeted style category in a case that the copy probability each is less than the copy probability threshold, to obtain word similarity corresponding to each candidate word; and obtaining, based on the word similarity, the current reply word corresponding to the targeted style category.

In some embodiments, the server performs similarity calculation on the vectorized representation of each candidate word in the preset word list and the style category vector of the targeted style category when the copy probability is less than the copy probability threshold, to obtain word similarity corresponding to each candidate word, and compares the word similarity corresponding to each candidate word, to select the candidate word with the greatest word similarity as the current reply word corresponding to the targeted style category.

In some embodiments, by performing similarity calculation on the vectorized representation of each candidate word in the preset word list and the style category vector of the targeted style category, word similarity corresponding to each candidate word may be obtained, and then based on the word similarity, the current reply word may be determined, to obtain the current reply word corresponding to the targeted style category.

In some embodiments, the continuing to perform reply word prediction based on the vectorized representation of each word in the segmented word set, the style category vector of the targeted style category, and the current reply word in a case that the reply word prediction meets a prediction continuing condition, to obtain the at least one predicted reply word corresponding to the targeted style category includes:

performing reply word prediction based on the vectorized representation of each word in the segmented word set, the style category vector of the targeted style category, and the current reply word in a case that the reply word prediction meets the prediction continuing condition, to obtain a next reply word corresponding to the current reply word;

jumping to the operation of performing reply word prediction based on the vectorized representation of each word in the segmented word set, the style category vector of the targeted style category, and the current reply word, to obtain a next reply word corresponding to the current reply word by using the next reply word as a new current reply word; and obtaining the at least one predicted reply word corresponding to the targeted style category based on a current reply word obtained by performing reply word prediction each time until the reply word prediction meets the prediction stop condition.

In some embodiments, when the reply word prediction meets the prediction continuing condition, it indicates that based on generating the current reply word, reply word prediction further needs to continue to be performed. The server performs reply word prediction based on the vectorized representation of each word in the segmented word set, the style category vector of the targeted style category, and the current reply word, to obtain a next reply word corresponding to the current reply word, uses the next reply word as a new current reply word, jumps to an operation of performing reply word prediction based on the vectorized representation of each word in the segmented word set, the style category vector of the targeted style category, and the current reply word, to obtain the next reply word corresponding to the current reply word, continues to generate a new current reply word until the reply word prediction meets the prediction stop condition, and obtains, based on the current reply word obtained by performing reply word prediction each time, at least one predicted reply word corresponding to the targeted style category.

In some embodiments, each time obtaining the next reply word corresponding to the current reply word, the server first performs decoding on the style category vector of the targeted style category and the current reply word, to obtain a decoded vector, and then performs reply word prediction based on the decoded vector and the vectorized representation of each word in the segmented word set. In other words, based on the copy mechanism, the server selects to generate the next reply word corresponding to the current reply word from the preset word list, or to directly copy a word from each word in the segmented word set as the next reply word corresponding to the current reply word.

In some embodiments, the server performs similarity calculation on the vectorized representation of each word in the segmented word set and the decoded vector, to obtain a copy probability corresponding to each word in the segmented word set and the decoded vector, and compare a copy probability and a copy probability threshold that separately correspond to each word in the segmented word set and the decoded vector. When there is at least one first word whose copy probability is greater than or equal to the copy probability threshold, it indicates that a word may be directly copied from at least one first word as the next reply word, and the copied word is a word with a highest copy probability among the at least one first word. When the copy probability is less than the copy probability threshold, it indicates that a next reply word needs to be generated from the preset word list, and the server obtains the next reply word from the preset word list.

In some embodiments, the server performs similarity calculation on the vectorized representation of each candidate word in the preset word list and the style category vector of the targeted style category when the copy probability is less than the copy probability threshold, to obtain word similarity corresponding to each candidate word and the decoded vector, and compares the word similarity corresponding to each candidate word and the decoded vector, to select the candidate word with the greatest word similarity as the next reply word.

In some embodiments, after reply content corresponding to at least one style category in the style distribution of the to-be-replied interactive content is generated based on the description content, the to-be-replied interactive content, and the style category vector, the method further includes:

- obtaining a fourth style category set corresponding to the reply content and a fifth style category set of a reply content release party corresponding to the reply content;
- obtaining, based on the fourth style category set and the fifth style category set, a style similarity corresponding to the reply content;
- performing interaction prediction based on the reply content, the fourth style category set, the description content, the to-be-replied interactive content, and the third style category set, to obtain an estimated interaction rate corresponding to the reply content, where the estimated interaction rate corresponding to the reply content refers to a probability that reply content obtained by prediction is interacted with; and
- sorting the reply content according to the style similarity and the estimated interaction rate that correspond to the reply content, to obtain a reply content sorting result.

The fourth style category set corresponding to the reply content may also be referred to as the style distribution corresponding to the reply content, and is configured for describing the distribution of the style category of the reply content. The fifth style category set of the reply content release party may also be referred to as the style distribution of the reply content release party, and is configured for describing the distribution of the style category of the reply content release party. Interaction prediction refers to predicting whether the reply content is interacted with, and the estimated interaction rate refers to the probability of the reply content obtained by prediction that is interacted with.

In some embodiments, the server performs style recognition on the reply content, to obtain the fourth style category set corresponding to the reply content, and obtain at least one piece of released interactive content of the reply content release party corresponding to the reply content, and based on the at least one piece of released interactive content, obtains the fifth style category set of the reply content release party. After obtaining the fourth style category set and the fifth style category set, the server calculates style distribution similarity between the fourth style category set and the fifth style category set, obtains, based on the style distribution similarity, a style similarity corresponding to the reply content, performs interaction prediction based on the reply content, the fourth style category set, the description content, the to-be-replied interactive content, and the third style category set, to obtain the estimated interaction rate corresponding to the reply content, and sorts the reply content according to the style similarity and the estimated interaction rate that correspond to the reply content, to obtain a reply content sorting result.

In some embodiments, a manner of performing style recognition on the reply content is similar to the manner of performing style recognition on the at least one piece of historical interactive content. When obtaining the fifth style category set of the reply content release party, the server performs style recognition on at least one piece of released interactive content, to obtain the style category set corresponding to the at least one piece of released interactive content and the style category probability of each style category in the style category set, and performs weighted averaging on the style category probability of each style category in the style category set corresponding to the at least one piece of released interactive content, to obtain the fifth style category set of the reply content release party. A manner of performing style recognition on the at least one piece of released interactive content is similar to the manner of performing style recognition on the at least one piece of historical interactive content.

In some embodiments, when calculating the style distribution similarity between the fourth style category set and the fifth style category set, the server may encode each style category in the fourth style category set, to obtain the style category vector corresponding to the fourth style category set, and encodes each style category in the fifth style category set, to obtain the style category vector corresponding to the fifth style category set. The server calculates cosine similarity between the style category vector corresponding to the fourth style category set and the style category vector corresponding to the fifth style category set, to use the cosine similarity as the style distribution similarity. After obtaining the cosine similarity, the style similarity corresponding to the reply content is obtained based on the cosine similarity. For example, the style similarity may be (1−cosine similarity), namely, a difference between 1 and the cosine similarity.

In some embodiments, the style similarity corresponding to the reply content may be obtained based on the fourth style category set corresponding to the reply content and the fifth style category set of the reply content release party. Interaction prediction may be implemented based on the reply content, the fourth style category set, the description content, the to-be-replied interactive content, and third style category set, to obtain the estimated interaction rate corresponding to the reply content. In this way, the reply content may be sorted according to the style similarity and the estimated interaction rate that correspond to the reply content, to obtain a reply content sorting result, so that the reply content may be sorted and displayed according to the reply content sorting result, and an adoption rate and an interaction rate of the reply content may be improved.

In some embodiments, the performing interaction prediction based on the reply content, the fourth style category set, the description content, the to-be-replied interactive content, and the third style category set, to obtain an estimated interaction rate corresponding to the reply content includes:

encoding the reply content and the fourth style category set, to obtain a first vector representation corresponding to the reply content, and encoding the to-be-replied interactive content and the third style category set, to obtain a second vector representation corresponding to the to-be-replied interactive content;

encoding the description content, to obtain a vector representation corresponding to the description content; and fusing the vector representation corresponding to the description content, the first vector representation, and the second vector representation, to obtain the estimated interaction rate corresponding to the reply content.

In some embodiments, the server encodes the reply content and the fourth style category set, to obtain a first vector representation corresponding to the reply content, encodes the to-be-replied interactive content and the third style category set, to obtain a second vector representation corresponding to the to-be-replied interactive content, encodes the description content, to obtain a vector representation corresponding to the description content, fuses the vector representation corresponding to the description content, the first vector representation, and the second vector representation, and obtains the estimated interaction rate corresponding to the reply content based on the third fused vector representation.

In some embodiments, a manner of fusing the vector representation corresponding to the reply content, the vector representation corresponding to the to-be-replied interactive content, and the vector representation corresponding to the description content is not limited herein. For example, the vector representation corresponding to the description content, the first vector representation, and the second vector representation may be fused based on an attention mechanism. The attention mechanism is an allocation mechanism. A core idea of the attention mechanism is to highlight some important characteristics of an object, and redistribute resources, namely, weights, according to importance of an attention object. Implementation of the core idea is to find correlation between attention objects based on original data, and then highlight some important characteristics of the attention objects. In some embodiments, in other words, based on the first vector representation, the second vector representation, and the vector representation corresponding to the description content, correlation between the reply content, the to-be-replied interactive content, and the description content is found, to highlight some important characteristics in their vector representations through interactive fusion, and obtain the estimated interaction rate corresponding to the reply content based on these important characteristics.

In some embodiments, the server may obtain the estimated interaction rate corresponding to the reply content based on the pre-trained interaction rate estimation model. The pre-trained interaction rate prediction model may be obtained by training data such as the released reply content and the released interactive content, and data whose quantity of interactions meets a specific threshold may be selected as a positive sample, and data whose quantity of interactions does not meet a specific threshold may be selected as a negative sample to perform training. The specific threshold may be configured according to an actual application scenario, and the quantity of interactions may include a quantity of behaviors such as likes, reposts, replies, and the like.

Figure 6:
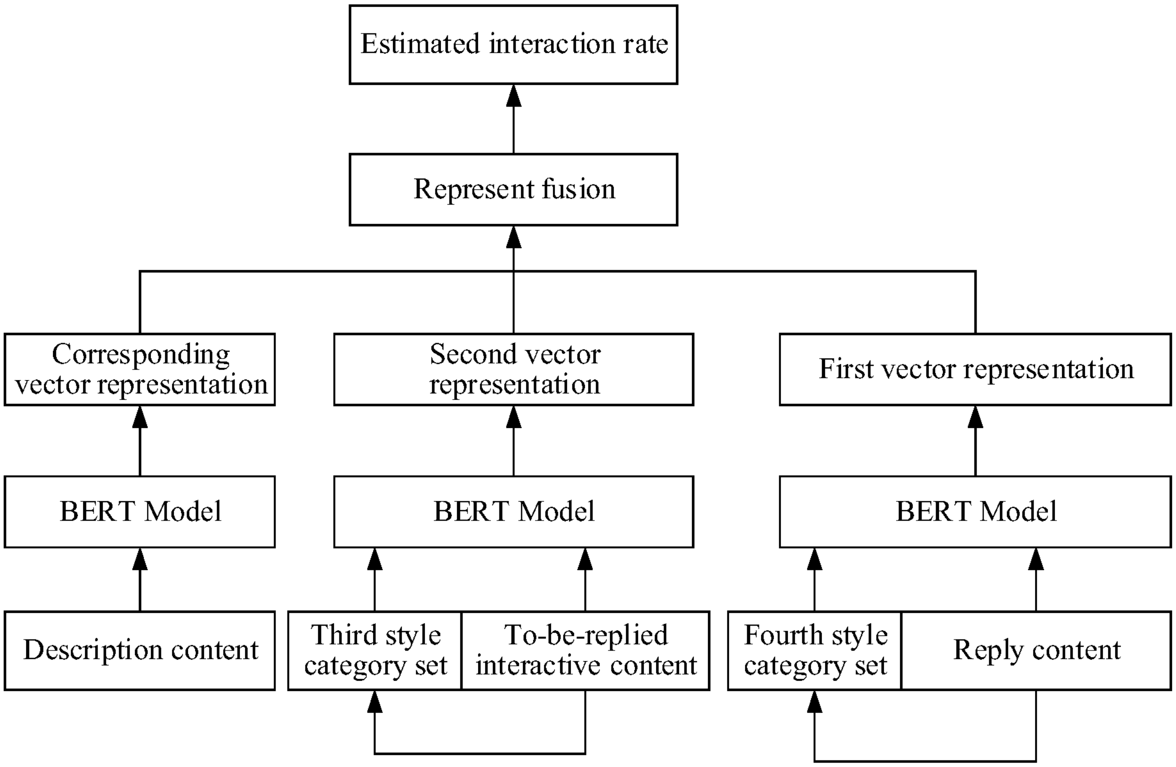
FIG. 6 is a schematic diagram of an interaction rate estimation model according to some embodiments.

In some embodiments, the specific interaction rate prediction model is not limited herein, provided that interaction rate prediction model may be implemented. For example, as shown in FIG. 6, the interaction rate prediction model may be a model based on a BERT model. When performing interaction prediction, encoding may be separately performed on the reply content, the fourth style category set, the to-be-replied interactive content, the third style category set, and the description content through the BERT model, to obtain the first vector representation corresponding to the reply content, the second vector representation corresponding to the to-be-replied interactive content, and the vector representation corresponding to the description content. The vector representation corresponding to the description content, the first vector representation, and the second vector representation are fused, and the estimated interaction rate corresponding to the reply content is obtained based on the third fused vector representation.

In some embodiments, interaction prediction may be performed through comprehensively considering the reply content, the fourth style category set, the description content, the to-be-replied interactive content, and the third style category set, to determine an estimated interaction rate corresponding to the reply content.

In some embodiments, the reply content processing method in this application is described by using dynamic style video comment reply generation. Video comment reply means that when an object browsing a video browses comments under the video of another object, and when intending to discuss and interact with the comments under the video, the object browsing the video considers a style of reply, such as a poetry style, a spoof style, and the like. For example, the object browsing the video may be a user who browses the video.

The inventor believes that generating replies by using content of the to-be-replied comment results in a monotonous style of generated comment replies, which cannot meet differentiated style requirements of the majority of objects who browse videos on a video platform, and further leads to a single style of community interaction on the video platform, reducing interaction activity of the entire platform. The reply content processing method in this application is applied when the dynamic style video comment reply is generated. Through joint in-depth modeling analysis of the video content, the to-be-replied comment, and the comment release party, the style distribution of the to-be-replied comment is recognized, and reply content of a plurality of styles is generated for the object currently browsing the video, so that the object browsing the video may directly select a reply of a proper style, thereby reducing a cost of reply input for the object browsing the video, and improving efficiency of reply interaction for the object browsing the video, and the reply style is more in line with the intention of the object browsing the video. In addition, correlation between the generated comment reply and the object currently browsing the video and the interaction prediction are combined to prioritize the generated comment reply of different styles, further improving satisfaction of the selective comment reply of the object browsing the video and efficiency of reply. By combining style inclination of the to-be-replied comment, the comment release party, and the current reply object, the generated future interaction estimate of the reply may generate comment of various styles for different objects browsing the video at different time points, improve style dynamic diversity of the comment reply, and further enhance interaction atmosphere of the video platform.

Figure 7:
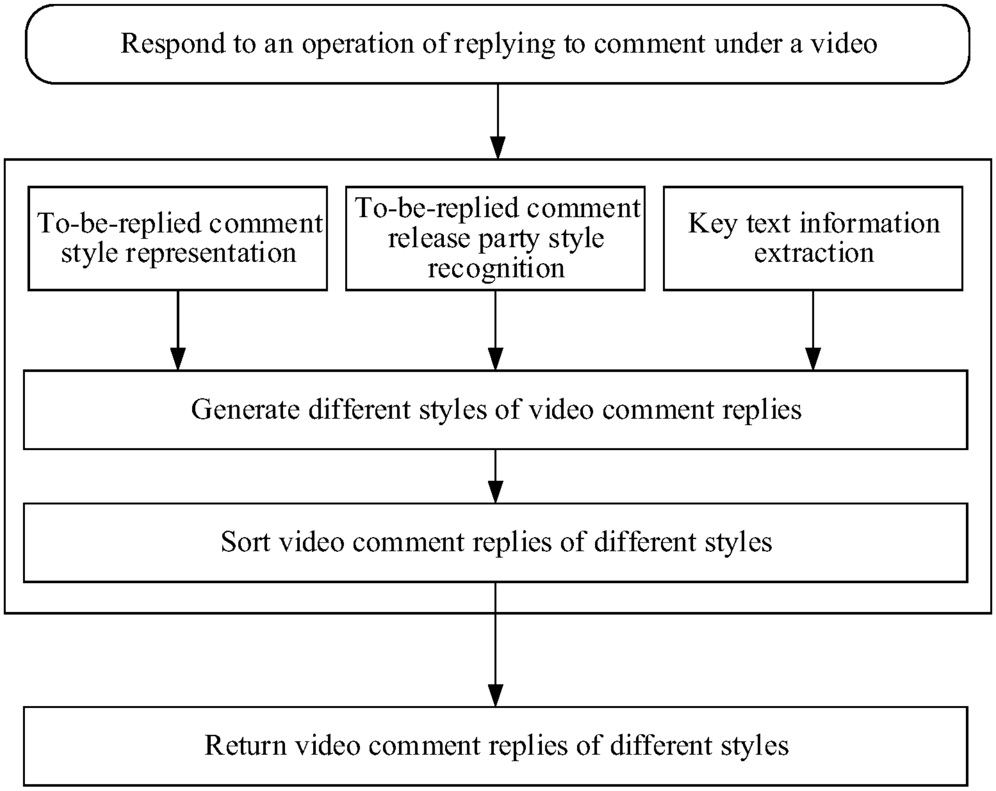
FIG. 7 is a schematic flowchart of dynamic style video comment reply generation according to some embodiments.

In some embodiments, a schematic flowchart of dynamic style video comment reply generation is shown in FIG. 7. In response to an operation of replying to the comment under the video, the server performs style recognition on the to-be-replied comment, performs style recognition on a release party of the to-be-replied comment and extracts key text information, generates video comment replies of different styles based on the style category set of the to-be-replied comment, the style category set of the release party of the to-be-replied comment, and the extracted key text information, and sorts video comment replies of different styles, and returns video comment replies of a plurality of styles for the object browsing the video to use.

First, the style distribution of the to-be-replied video (media content) comment (namely, the to-be-replied interactive content) needs to be recognized, that is, the first style category set of the to-be-replied comment needs to be recognized.

The server performs style recognition based on the video content (namely, the description content) and the comment text of the video comment, to obtain the first style category set of the to-be-replied comment. In some embodiments, the server performs encoding processing on the video content and the comment text of the video comment, to obtain the vectorized representation of each word in the video content and the comment text, fuses the vectorized representation of each word in the video content and the comment text, and based on the first fused vector representation, initially obtains the first style category set (namely, the first style distribution) of the to-be-replied comment.

Figure 8:
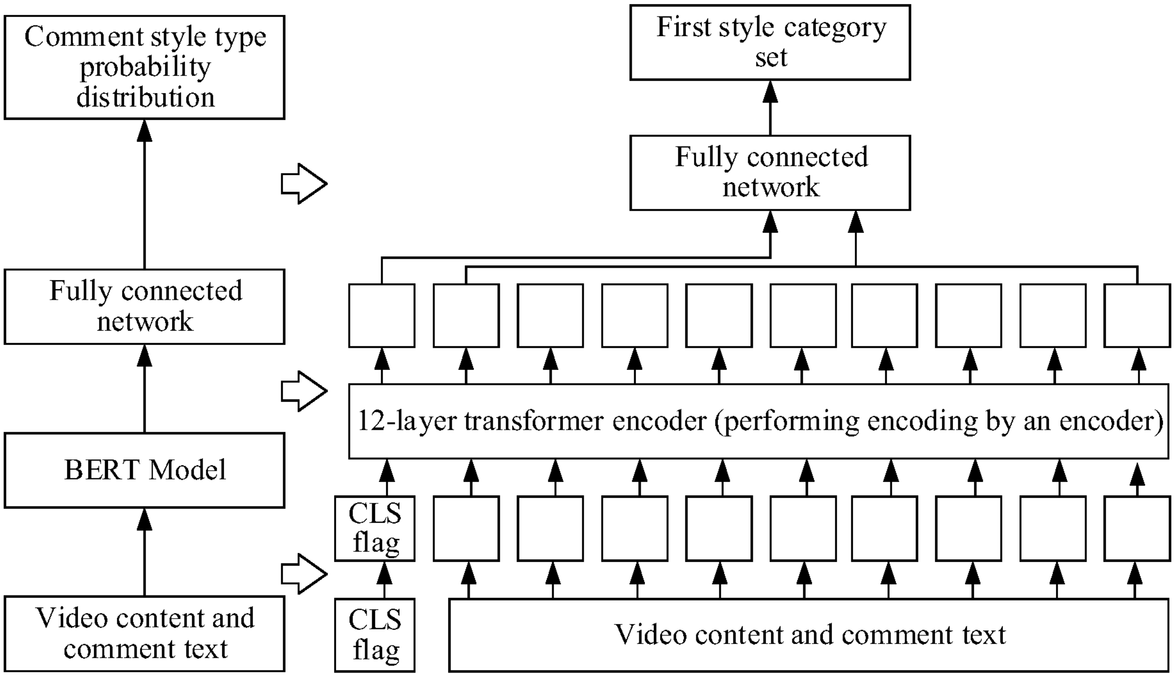
FIG. 8 is a schematic diagram of a video comment style recognition model according to some embodiments.

In some embodiments, the server may recognize the first style category set to which the to-be-replied comment belongs through the video comment style recognition model shown in FIG. 8. When recognizing the first style category set, the server obtains the style category probability that the to-be-replied comment belongs to each style category in the first style category set. After inputting the video content and the comment text into the video comment style recognition model, the video comment style recognition model encodes the CLS flag, the video content, and the comment text through the BERT model, to obtain the vector representation corresponding to the CLS flag and the vectorized representation of each word in the video content and comment text. The vector representation corresponding to the CLS flag and the vectorized representation of each word in the video content and the comment text are fused through a fully connected network, and style classification is performed based on the first fused vector representation, to obtain the first style category set. The video comment style recognition model may be obtained through performing supervised training on the interactive content data set labeled with the style category. For example, a format of the interactive content data set labeled with the style category may be in the form of [media content 1 interactive content 1 interactive content 1 style interactive content reply 1 interactive content reply 1 style . . . ].

Style recognition needs to be performed on the release party of the to-be-replied comment.

The server obtains at least one piece of historical released comment (namely, historical interactive content) from the release party, and performs style recognition on the at least one piece of historical released comment, to obtain a historical style category set corresponding to the at least one piece of historical released comment and a style category probability of each historical style category in the historical style category set, and performs weighted averaging on the style category probability of each historical style category, to obtain the second style category set (namely, the second style distribution) to which the release party of the to-be-replied comment belongs. The inventor believes that by considering the style of the release party of the to-be-replied comment, accuracy of comment style recognition may be improved. Therefore, the server comprehensively considers the initially obtained first style category set of the to-be-replied comment and the second style category set of the release party of the to-be-replied comment, and determines the third style category set (namely, the style distribution of the to-be-replied interactive content) of the to-be-replied comment.

In some embodiments, the server may also recognize the historical style category set corresponding to the historical released comment through the video comment style recognition model shown in FIG. 8, and obtain the style category probability of each historical style category in the historical style category set. In this case, input of the video comment style recognition model is the historical released comment instead of the video content and the comment text. After inputting the historical released comment into the video comment style recognition model, the video comment style recognition model encodes the CLS flag and the historical released comment through the BERT model, to obtain the vector representation corresponding to the CLS flag and the vector representation corresponding to the historical released comment. The vector representation corresponding to the CLS flag and the vector representation corresponding to the historical released comment are fused through a fully connected network, and style classification is performed based on the second fused vector representation, to obtain the historical style category set corresponding to the historical released comment and the style category probability of each historical style category in the historical style category set.

The video comment style recognition model may be obtained through performing supervised training on the interactive content data set labeled with the style category. For example, a format of the interactive content data set labeled with the style category may be in the form of [media content 1 interactive content 1 interactive content 1 style interactive content reply 1 interactive content reply 1 style . . . ].

Key text information needs to be extracted.

To enrich and improve the text configured to generate the reply content, and improve the generation quality, the server also performs style recognition on other comment (comment other than the to-be-replied comment) on the video and replies (namely, interactive content), and uses other comment and replies with similar styles and similar content as key text information. In this case, the server calculates the style similarity between other comment and replies and the to-be-replied comment, as well as the content similarity between other comment and replies and the to-be-replied comment, determines the similarity between other comment and replies and the to-be-replied comment based on the style similarity and content similarity that correspond to other comment and replies, and uses other comment and replies whose similarity meets a similarity threshold as key text information.

A manner of performing style recognition on other comment and replies on the video is similar to a manner of performing style recognition on at least one piece of historical released comment. In some embodiments, similarity between other comment and replies and the to-be-replied comment may be obtained by performing weighted summation on the style similarity and the content similarity. A formula for performing weighted summation may be: similarity between other comment and replies and the to-be-replied comment=ws1*style similarity+ws2*content similarity, where ws1 is a weight of the style similarity, ws2 is a weight of the content similarity, and both ws1 and ws2 are weight coefficients that are configured according to an actual application scenario. Style similarity=similarity of style distribution vectors of two pieces of comments, which may be (1−cosine similarity). Content similarity=1−editing distance of two pieces of comments/max (length of two pieces of comments). max (length of two pieces of comments) refers to a maximum length of the two pieces of comments, and the editing distance of the two pieces of comments/max (length of two pieces of comments) refers to a ratio of the editing distance of the two pieces of comments to the maximum length of the two pieces of comments.

Different styles of video comment replies need to be generated.

The server performs word segmentation on the video content, the to-be-replied comment, and other similar comment, to obtain a segmented word set, performs vectorization processing on each word in the segmented word set, to obtain a vectorized representation of each word in the segmented word set, performs reply word prediction based on the vectorized representation of each word in the segmented word set and the style category vector corresponding to each style category in the third style category set, to generate at least one predicted reply word corresponding to each style category, and generate the video comment reply (namely, reply content) corresponding to each style category based on the at least one predicted reply word corresponding to each style category.

When generating the predicted reply word, the server selects, based on a copy mechanism, to generate a predicted reply word from a preset word list or directly copies a word as a predicted reply word from each word of the description content and the to-be-replied interactive content. In some embodiments, targeting each style category, the server performs reply word prediction based on the vectorized representation of each word in the segmented word set and a style category vector of the targeted style category, to obtain a current reply word corresponding to the targeted style category, when the reply word prediction meets the prediction stop condition, uses the current reply word as at least one predicted reply word corresponding to the targeted style category, when the reply word prediction meets the prediction continuing condition, performs reply word prediction based on the vectorized representation of each word in the segmented word set, the style category vector of the targeted style category, and the current reply word, to obtain a next reply word corresponding to the current reply word, uses the next reply word as a new current reply word, jumps to an operation of performing reply word prediction based on the vectorized representation of each word in the segmented word set, the style category vector of the targeted style category, and the current reply word, to obtain the next reply word corresponding to the current reply word until the reply word prediction meets the prediction stop condition, and obtains, based on the current reply word obtained by performing reply word prediction each time, at least one predicted reply word corresponding to the targeted style category.

When generating the current reply word, the server performs similarity calculation on the vectorized representation of each word in the segmented word set and the style category vector of the targeted style category, to obtain a copy probability corresponding to each word in the segmented word set, when there is at least one first word whose copy probability is greater than or equal to the copy probability threshold, obtains, based on the at least one first word, the current reply word corresponding to the targeted style category, when the copy probability each is less than the copy probability threshold, performs similarity calculation on the vectorized representation of each candidate word in the preset word list and the style category vector of the targeted style category, to obtain the word similarity corresponding to each candidate word, and based on the word similarity, obtains the current reply word corresponding to the targeted style category.

When generating the video comment reply separately corresponding to each style category, the server may select a style category in which the video comment reply needs to be generated based on the style category probability corresponding to each style category, to be specific, generate the corresponding video comment reply for a style category whose style category probability meets a category probability threshold. The category probability threshold may be configured according to an actual application scenario. In this way, calculation resources may be saved when generating the video comment reply corresponding to each style category.

Figure 9:
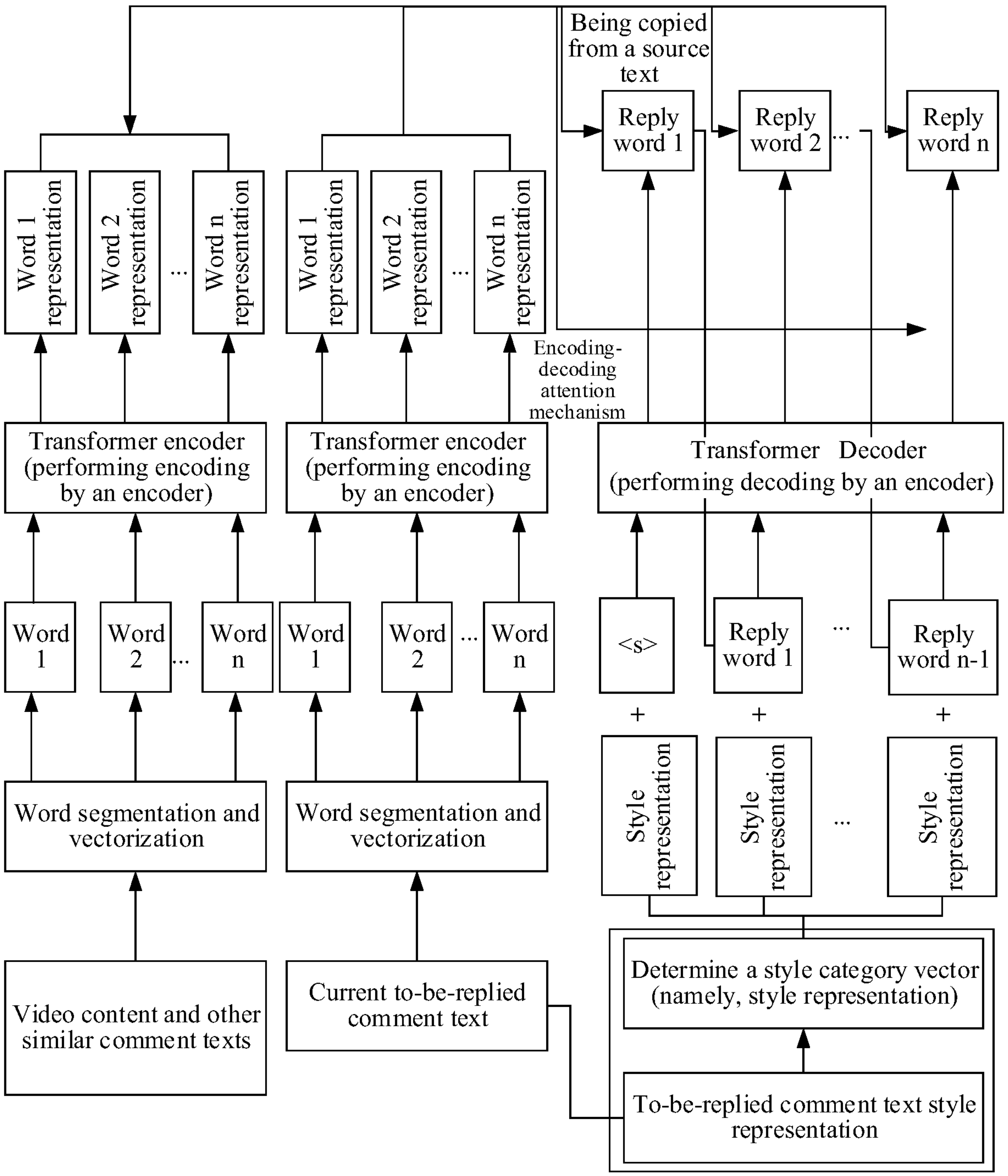
FIG. 9 is a schematic diagram of a dynamic style comment reply generation model according to some embodiments.

In some embodiments, the server may generate the video comment reply corresponding to each style category through the dynamic style comment reply generation model as shown in FIG. 9. Targeting each style category, when generating a video comment reply, word segmentation and vectorization processing are first performed on the video content, other similar comment texts, and the current to-be-replied comment text, to obtain the vectorized representation (that is, copied from a source text) of each word in the video content, other similar comment texts, and the current to-be-replied comment text, and then reply word prediction is performed based on the vectorized representation of each word and the style category vector (namely, style representation) of the targeted style category. In other words, based on the copy mechanism (namely, encoding-decoding attention mechanism), a reply word is selected to be generated from a preset word list or a word is directly copied from each word as a predicted reply word, to obtain at least one predicted reply word corresponding to the targeted style category, and at least one predicted reply word corresponding to the targeted style category is combined, to generate the video comment reply corresponding to the targeted style category.

When performing reply word prediction based on the vectorized representation of each word and the style category vector of the targeted style category, decoding is first performed on a style category vector and a start symbol (<S>) that correspond to the targeted style category in which the video comment reply needs to be generated. A reply word 1 is predicted based on the decoded vector and the vectorized representation of each word, and then decoding is performed on the style category vector of the targeted style category and the reply word 1. A reply word 2 is predicted based on the decoded vector and the vectorized representation of each word. Until a prediction stop condition is met, the generated n predicted reply words are combined, to generate the video comment reply corresponding to the targeted style category. A minimum value of n is 1, and a maximum value may be configured according to an actual application scenario in the prediction stop condition.

The dynamic style comment reply generation model may be obtained through performing supervised training on the interactive content data set labeled with the style category. In a training process, the style category vector uses a vector representation corresponding to the labeled style category. For example, a format of the interactive content data set labeled with the style category may be in the form of [media content 1 interactive content 1 interactive content 1 style interactive content reply 1 interactive content reply 1 style . . . ].

Finally, sorting of video comment replies of different styles needs to be prioritized.

Through the foregoing operations, replies of a plurality of styles are generated for the current to-be-replied comment. In this operation, through calculation of video comment replies corresponding to various style categories and style consistency the object currently browsing the video, and by performing interaction rate estimation on the generated reply content, an adoption rate of dynamic style replies by an object browsing the video may be increased, and an interaction rate of comment replies may be increased.

The server obtains the fourth style category set corresponding to the video comment reply and the fifth style category set of the object (namely, the video comment reply release party) currently browsing the video, based on the fourth style category set corresponding to the video comment reply and the fifth style category set of the object currently browsing the video, calculates the style similarity between the video comment reply corresponding to each style category and the object currently browsing the video, to obtain the style similarity corresponding to the video comment reply, performs interaction prediction based on the video comment reply, the fourth style category set corresponding to the video comment reply, the video content, the to-be-replied comment, and the third style category set of the to-be-replied comment, to obtain the estimated interaction rate corresponding to the video comment reply, and sorts the video comment replies according to the style similarity and the estimated interaction rate that correspond to the video comment replies, to obtain a video comment reply sorting result.

The style similarity corresponding to the video comment reply may be the cosine similarity between the fourth style category set corresponding to the video comment reply and the fifth style category set of the object currently browsing the video. When performing interaction prediction, the server encodes the video comment reply and the fourth style category set corresponding to the video comment reply, to obtain the first vector representation corresponding to the video comment reply, encodes the to-be-replied comment and the third style category set of the to-be-replied comment, to obtain a second vector representation corresponding to the to-be-replied comment, performs encodes the video content, to obtain a vector representation corresponding to the video content, fuses the vector representation corresponding to the description content, the first vector representation, and the second vector representation, and obtains the estimated interaction rate corresponding to the video comment reply based on the third fused vector representation.

According to the style similarity and the estimated interaction rate that correspond to the video comment replies, sorting scores corresponding to the video comment replies may be obtained, and then the video comment replies may be sorted by the sorting scores, to obtain the video comment reply sorting result. The sorting scores may be obtained by performing weighted summation on the style similarity and the estimated interaction rate. A specific weighted summation formula is: sorting scores=w1*style similarity+w2*estimated interaction rate, where w1 is a weight of the style similarity, w2 is a weight of the estimated interaction rate, and both w1 and w2 may be configured according to an actual application scenario.

Figure 10:
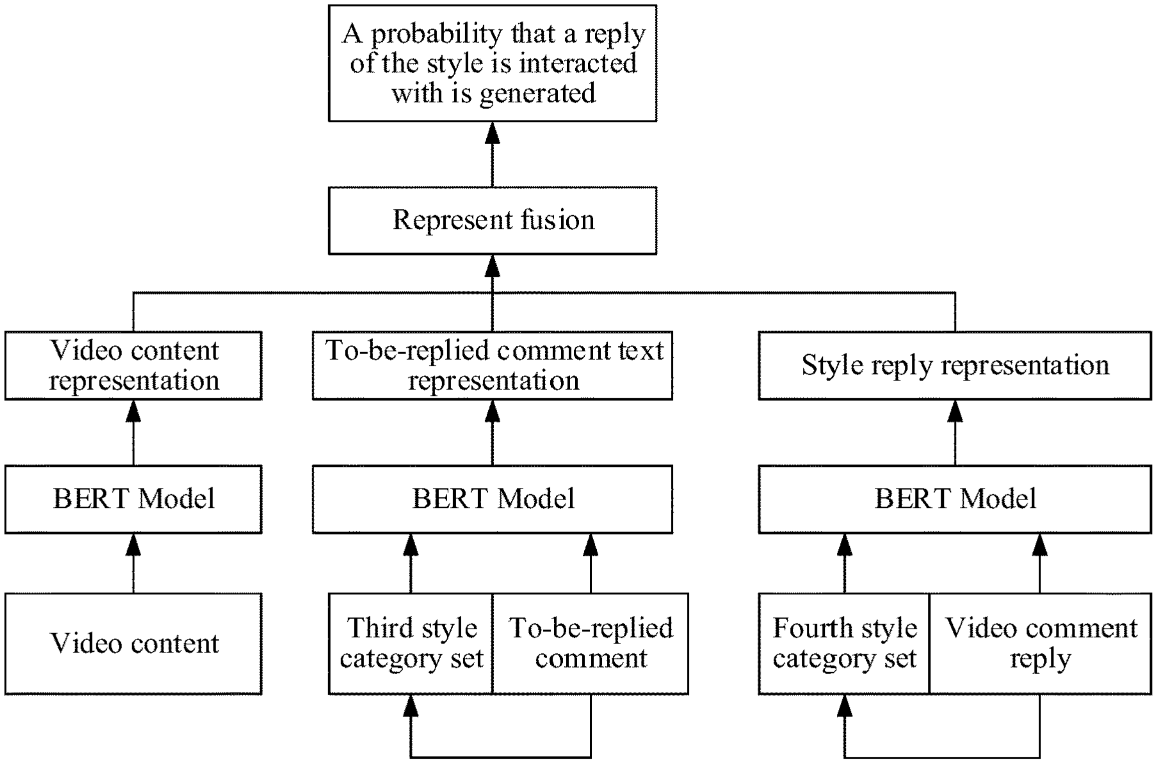
FIG. 10 is a schematic diagram of different style comment reply priority models according to some embodiments.

In some embodiments, the server may generate and obtain the estimated interaction rate corresponding to the video comment reply through comment reply priority models of different styles as shown in FIG. 10. When performing interaction prediction, encoding is performed on the video comment reply, the fourth style category set corresponding to the video comment reply, the to-be-replied comment, the third style category set of the to-be-replied comment, and the video content through a BERT model, to obtain the style reply representation corresponding to the video comment reply, the to-be-replied comment text representation corresponding to the to-be-replied comment, and the video content representation, the style reply representation, the to-be-replied comment text representation corresponding to the to-be-replied comment, and the video content representation are fused, and based on the third fused vector representation, a probability (namely, the estimated interaction rate) that a reply of the style is interacted with is generated.

Different style comment reply priority models may be obtained by training data such as the released reply content and the released interactive content, and data whose quantity of interactions meets a specific threshold may be selected as a positive sample, and data whose quantity of interactions does not meet a specific threshold may be selected as a negative sample to perform training. The specific threshold may be configured according to an actual application scenario, and the quantity of interactions may include a quantity of behaviors such as likes, reposts, replies, and the like.

Figure 11:
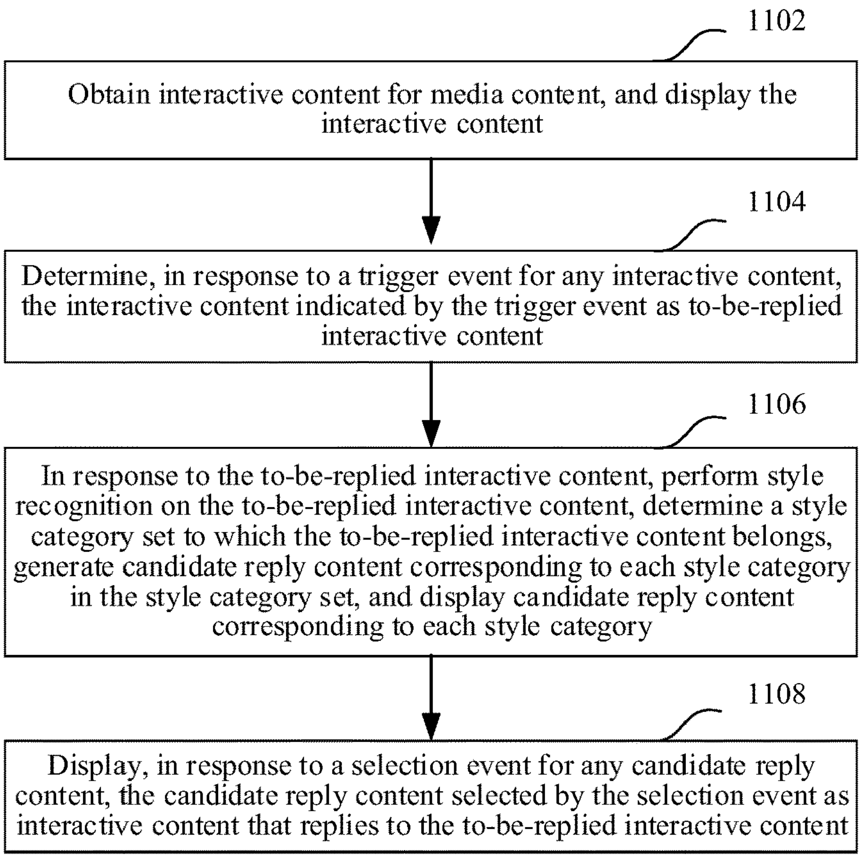
FIG. 11 is a schematic flowchart of an interaction method for interactive content of media content according to some embodiments.

In some embodiments, as shown in FIG. 11, an interaction method for interactive content of media content is provided. The method may be independently performed by the terminal or the server, or may be collaboratively performed by the terminal and the server. In embodiments of this application, description is provided by using an example in which the method is performed by the terminal, including the following operations:

Operation 1102: Obtain interactive content for media content, and display the interactive content.

Figure 12:
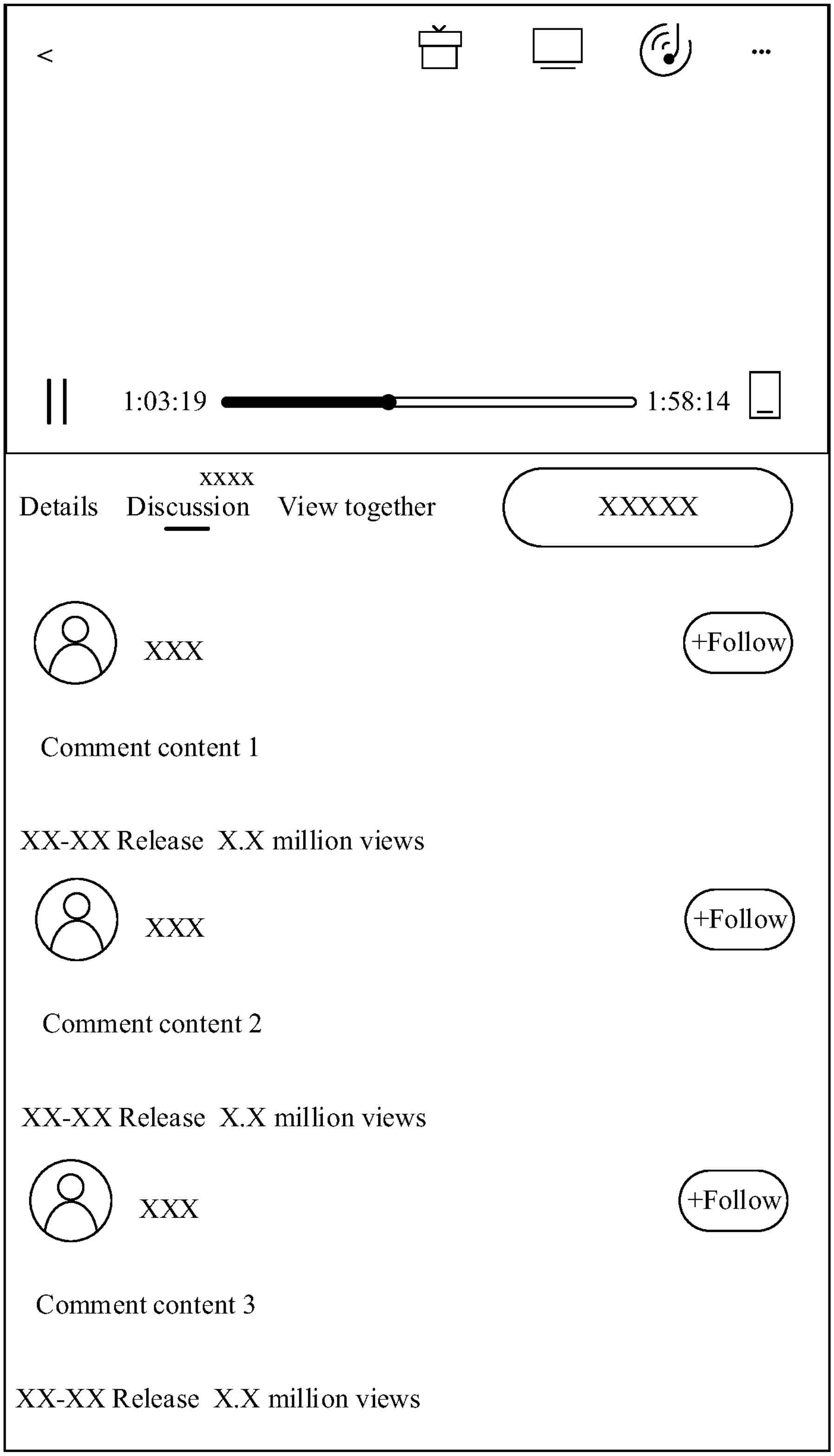
FIG. 12 is a schematic diagram displaying interactive content media content according to some embodiments.
Figure 13:
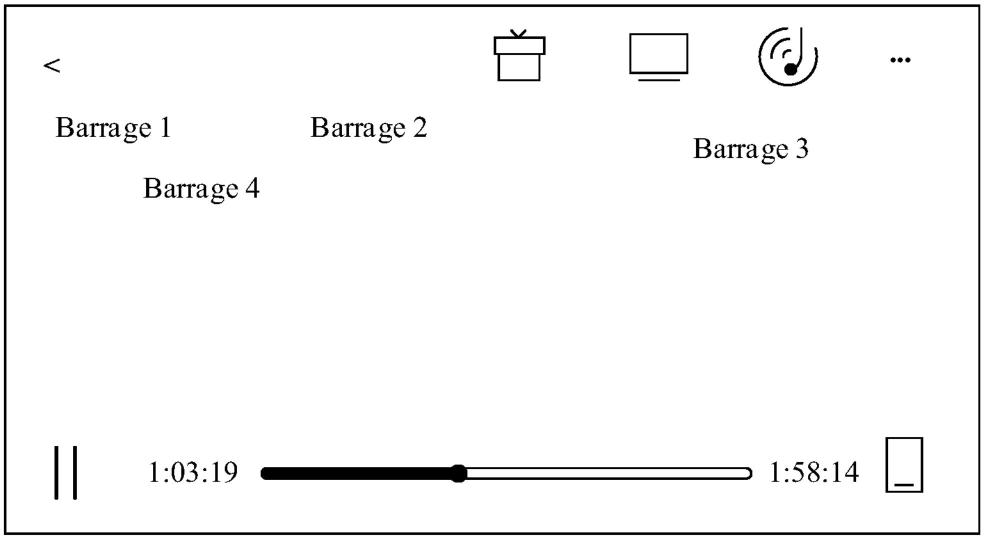
FIG. 13 is a schematic diagram displaying interactive content media content according to some embodiments.

In some embodiments, a terminal obtains the interactive content for the media content, and displays the interactive content. In some embodiments, the interactive content may refer to comment released by an object browsing the media content. For example, when the interactive content is a piece of comment, a schematic diagram of a terminal displaying the interactive content may be as shown in FIG. 12. When displaying the media content, the interactive content (namely, comment content 1, comment content 2, comment content 3, and the like) is displayed. In some embodiments, the interactive content may refer to barrages released by the object browsing the media content. For example, when the interactive content is a barrage, a schematic diagram of a terminal displaying the interactive content may be as shown in FIG. 13. When the terminal displays the media content in full screen, the interactive content (namely, a barrage 1, a barrage 2, a barrage 3, a barrage 4, and the like) is displayed on the media content. When the interactive content is a barrage, a display position and transparency of the interactive content may be automatically set by the object browsing the media content.

Operation 1104: Determine, in response to a trigger event for any interactive content, the interactive content indicated by the trigger event as to-be-replied interactive content.

In some embodiments, the terminal determines, in response to the trigger event for any interactive content, the interactive content indicated by the trigger event as the to-be-replied interactive content. In some embodiments, when wanting to reply to any interactive content, the object browsing the media content selects any displayed interactive content. The terminal determines, in response to the trigger event for any interactive content, the interactive content indicated by the trigger event as the to-be-replied interactive content.

In some embodiments, the trigger event for any interactive content may be a selection event for any interactive content, and the object browsing the media content may select any interactive content by clicking on a display region corresponding to any interactive content. A clicking manner may be single clicking, double clicking, and the like. The clicking manner is not limited herein.

Operation 1106: In response to the to-be-replied interactive content, perform style recognition on the to-be-replied interactive content, determine a style category set to which the to-be-replied interactive content belongs, generate candidate reply content corresponding to each style category in the style category set, and display candidate reply content corresponding to each style category.

The candidate reply content corresponding to each style category refers to the reply content selected by the object browsing the media content. The object browsing the media content may select any candidate reply content from the candidate reply content corresponding to each style category of the displayed to-be-replied interactive content as the interactive content that replies to the to-be-replied interactive content.

In some embodiments, in response to the to-be-replied interactive content, the terminal performs style recognition on the to-be-replied interactive content, determines a style category set to which the to-be-replied interactive content belongs, namely, the third style category set, generates candidate reply content corresponding to each style category in the style category set, and displays candidate reply content corresponding to each style category.

In some embodiments, the terminal performs encoding processing on description content of the media content and the to-be-replied interactive content, to obtain a vectorized representation of each word in the description content and the to-be-replied interactive content, performs style recognition based on the vectorized representation of each word in the description content and the to-be-replied interactive content, to obtain a first style category set to which the to-be-replied interactive content belongs, performs style recognition based on release party information of the to-be-replied interactive content, to obtain a second style category set to which the release party information belongs, determines a style category set of the to-be-replied interactive content according to the first style category set and the second style category set, determines a style category vector corresponding to each style category in the style category set of the to-be-replied interactive content, and performs reply word prediction based on the description content, the to-be-replied interactive content, and the style category vector, to generate candidate reply content corresponding to each style category in the style category set of the to-be-replied interactive content.

Figure 14:
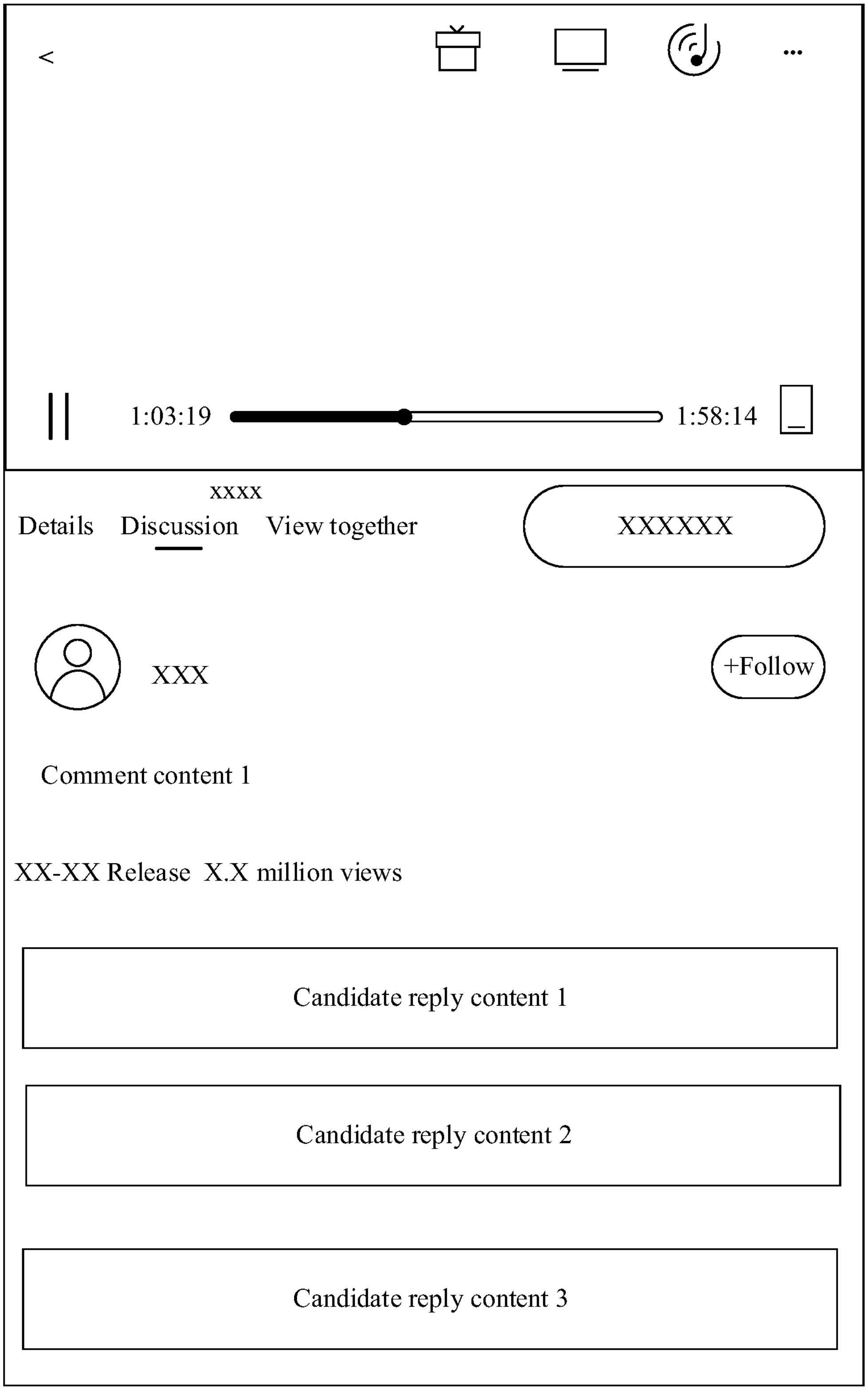
FIG. 14 is a schematic diagram displaying candidate reply content corresponding to at least one style category according to some embodiments.

In some embodiments, the candidate reply content corresponding to each style category may be displayed above other interactive content other than the to-be-replied interactive content. For example, a schematic diagram showing candidate reply content corresponding to each style category may be shown in FIG. 14. The candidate reply content corresponding to each style category is displayed below the to-be-replied interactive content and above (namely, candidate reply content 1, candidate reply content 2, and candidate reply content 3 in the figure) other interactive content other than the to-be-replied interactive content. In other words, other interactive content is not displayed in this case.

Figure 15:
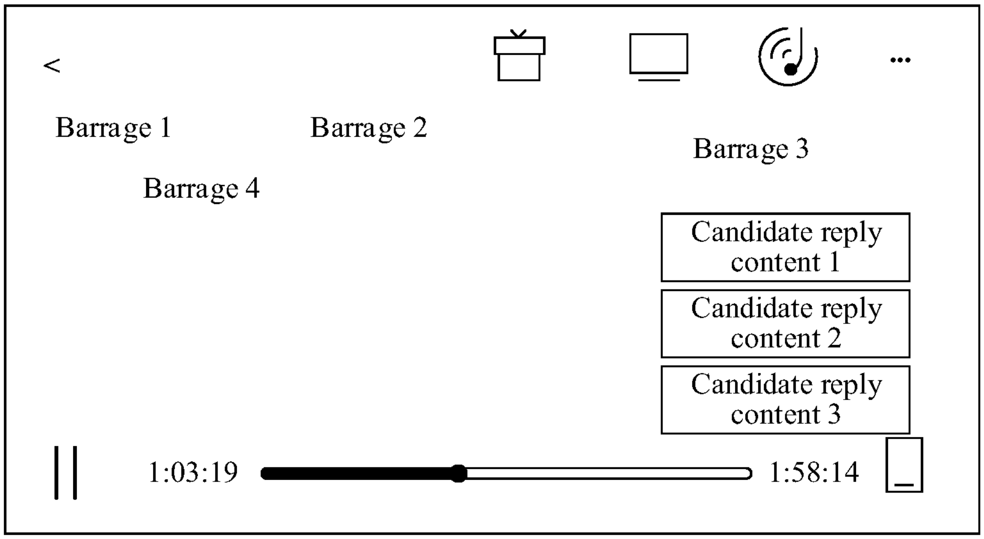
FIG. 15 is a schematic diagram displaying candidate reply content corresponding to at least one style category according to some embodiments.

In some embodiments, the candidate reply content corresponding to each style category may be displayed above the media content. For example, a schematic diagram showing candidate reply content corresponding to each style category may be shown in FIG. 15. The candidate reply content separately corresponding to each style category is displayed above the media content, and partially blocks the media content (namely, candidate reply content 1, candidate reply content 2, and candidate reply content 3 in the figure). Further, in order not to affect display of the media content, the object browsing the media content may set display transparency of the candidate reply content corresponding to each style category.

Figure 16:
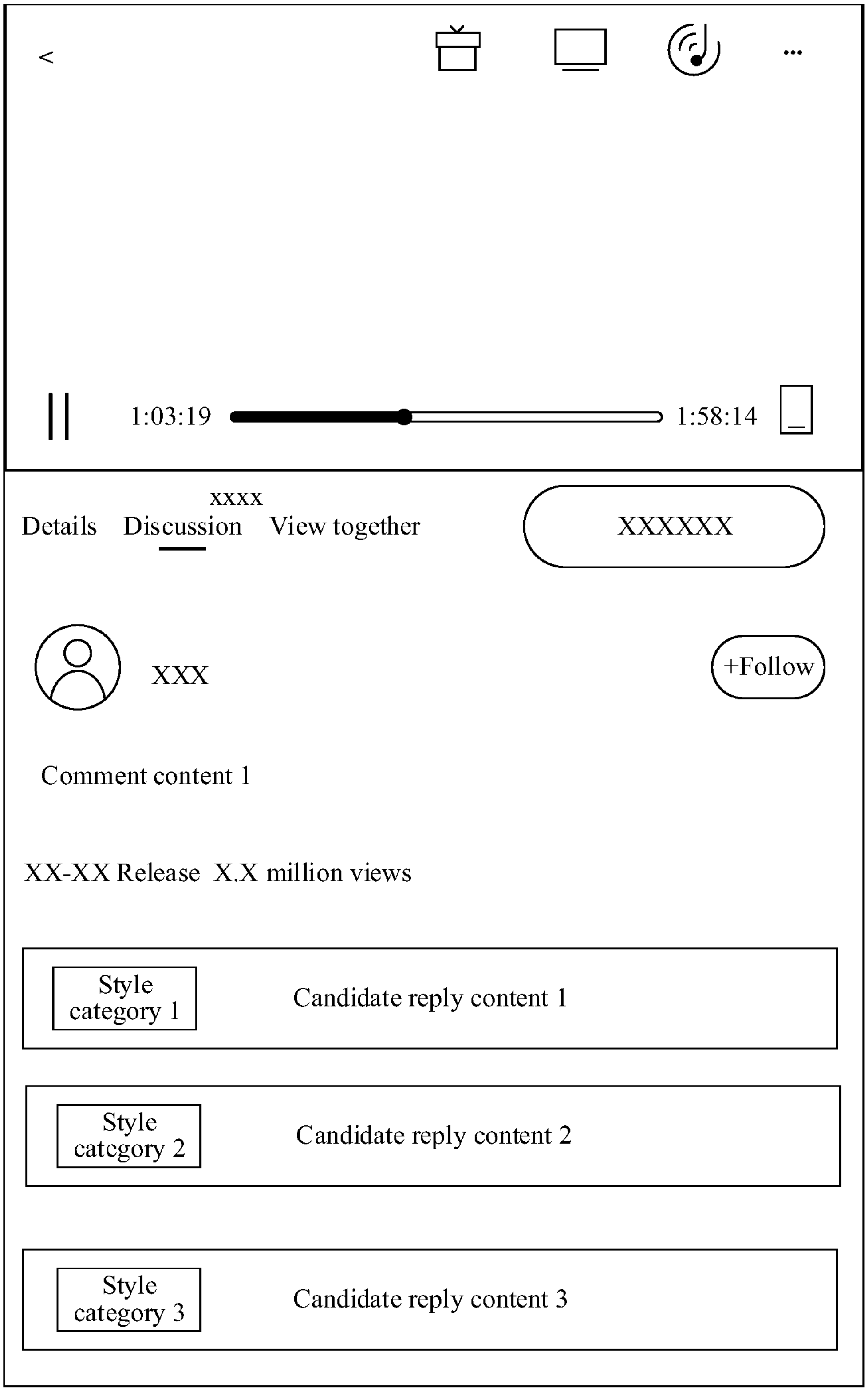
FIG. 16 is a schematic diagram displaying candidate reply content corresponding to at least one style category according to some embodiments.

In some embodiments, when displaying the candidate reply content corresponding to each style category, the terminal further displays the style category corresponding to the candidate reply content, so that the object browsing the media content may implement quick selection based on the style category. For example, a schematic diagram showing candidate reply content corresponding to each style category may be shown in FIG. 16. When displaying the candidate reply content corresponding to each style category, the style category corresponding to the candidate reply content is displayed.

Operation 1108: Display, in response to a selection event for any candidate reply content, the candidate reply content selected by the selection event as interactive content that replies to the to-be-replied interactive content.

In some embodiments, the object browsing the media content may view the candidate reply content separately corresponding to each style category through the terminal. When the object browsing the media content wants to select any candidate reply content as the interactive content that replies to the to-be-replied interactive content, the terminal displays, in response to a selection event for any candidate reply content, the candidate reply content selected by the selection event as the interactive content that replies to the to-be-replied interactive content.

In some embodiments, the object browsing the media content may select any candidate reply content by clicking on a display region corresponding to any candidate reply content. A clicking manner may be single clicking, double clicking, and the like. The clicking manner is not limited herein.

In the foregoing interaction method for interactive content of media content, by displaying the interactive content of the media content, in response to a trigger event for any interactive content, the interactive content indicated by the trigger event is determined as the to-be-replied interactive content, corresponding to the to-be-replied interactive content, style recognition is performed on the to-be-replied interactive content, the style category set to which the to-be-replied interactive content belongs is determined, the candidate reply content corresponding to each style category in the style category set is generated, and the candidate reply content corresponding to each style category is displayed, which may provide the candidate reply content corresponding to each style category as selection for the interactive content. In this way, in response to a selection event of any candidate reply content, the candidate reply content selected by the selection event may be displayed as the interactive content that replies to the to-be-replied interactive content, so that the reply content does not need to be entered for replying, and reply efficiency may be improved.

In some embodiments, the displaying candidate reply content corresponding to each style category includes:

- performing interaction prediction based on the candidate reply content corresponding to each style category, the to-be-replied interactive content, and description content of the media content, to obtain an estimated interaction rate corresponding to the candidate reply content corresponding to each style category; the estimated interaction rate corresponding to the candidate reply content refers to a probability that candidate reply content obtained by prediction is interacted with; and
- displaying the candidate reply content corresponding to each style category in descending order of the estimated interaction rate.

In some embodiments, corresponding to the to-be-replied interactive content, the terminal performs interaction prediction based on the candidate reply content separately corresponding to each style category, the to-be-replied interactive content, and the description content of the media content, to obtain an estimated interaction rate corresponding to the candidate reply content separately corresponding to each style category, and displays the candidate reply content corresponding to each style category of the to-be-replied interactive content in descending order of the estimated interaction rate corresponding to the candidate reply content.

In some embodiments, the estimated interaction rate may be obtained through a method of obtaining the estimated interaction rate corresponding to the reply content in the foregoing embodiment. The server obtains the fourth style category set corresponding to the candidate reply content and the fifth style category set of the reply content release party corresponding to the candidate reply content, obtains the style similarity corresponding to the candidate reply content based on the fourth style category set and the fifth style category set, performs interaction prediction based on the candidate reply content, the fourth style category set, the description content, the to-be-replied interactive content, and the style category set (namely, the third style category set) of the to-be-replied interactive content, to obtain the estimated interaction rate corresponding to the candidate reply content.

In some embodiments, when displaying the candidate reply content corresponding to each style category of the to-be-replied interactive content, the terminal displays the estimated interaction rate corresponding to the candidate reply content, so that the object browsing the media content may select the candidate reply content based on the estimated interaction rate.

In some embodiments, when displaying the candidate reply content corresponding to each style category of the to-be-replied interactive content, the terminal displays the estimated interaction rate and the style category that correspond to the candidate reply content, so that the object browsing the media content may select the candidate reply content based on the estimated interaction rate and the style category.

In some embodiments, corresponding to the to-be-replied interactive content, interaction prediction is performed based on the candidate reply content corresponding to each style category, the to-be-replied interactive content, and the description content of the media content, to obtain an estimated interaction rate corresponding to the candidate reply content corresponding to each style category, and the candidate reply content corresponding to each style category of the to-be-replied interactive content is displayed in descending order of the estimated interaction rate, so that the estimated interaction rate may be used as selection guidance, to help implement quick selection based on the estimated interaction rate.

In some embodiments, the generating candidate reply content corresponding to each style category in the style category set includes:

- determining a style category vector corresponding to each style category in the style category set; and
- performing reply word prediction according to description content of the media content, the to-be-replied interactive content, and the style category vector, to generate the candidate reply content corresponding to each style category in the style category set.

In some embodiments, the server may determine the style category vector corresponding to each style category in the style category set by querying a preset style category vector table. The preset style category vector table is pre-configured with a corresponding relationship between the style category and the style category vector. The server may further directly encode each style category in the style category set, to obtain the style category vector corresponding to each style category in the style category set. After obtaining the style category vector, the server performs word segmentation and vectorization processing on the description content of the media content and the to-be-replied interactive content, to obtain the vectorized representation of each word in the description content and the to-be-replied interactive content, and performs reply word prediction based on the vectorized representation of each word and the style category vector, to generate candidate reply content corresponding to each style category in the style category set. In some embodiments, the server first performs, targeting each style category, reply word prediction based on the vectorized representation of each word and the style category vector of the targeted style category, to obtain at least one predicted reply word corresponding to the targeted style category, and generates candidate reply content corresponding to the targeted style category based on at least one predicted reply word corresponding to the targeted style category.

In some embodiments, through determining the style category vector, reply word prediction is performed according to the description content of the media content, the to-be-replied interactive content, and the style category vector, to generate the candidate reply content separately corresponding to each style category in the style category set, and candidate reply content separately corresponding to each style category may be automatically generated as selection for the interactive content, so that reply content does not need to be entered for replying, and reply efficiency may be improved.

Although the operations in the flowcharts involved in the embodiments are displayed sequentially according to instructions of arrows, these operations are not necessarily performed sequentially according to a sequence instructed by the arrows. Unless clearly specified herein, there is no strict sequence limitation on the execution of the operations, and the operations may be performed in another sequence. Moreover, at least some of the operations in the flowchart related to the embodiments may include a plurality of operations or a plurality of stages. The operations or stages are not necessarily performed at the same moment but may be performed at different moments. The operations or stages are not necessarily performed sequentially, but may be performed in turn or alternately with another operation or at least some of operations or stages of the another operation.

Based on the same inventive concept, embodiments of this application further provide a reply content processing apparatus configured to implement the reply content processing method and an interaction apparatus for interactive content of media content configured to implement the interaction method for interactive content of media content. An implementation solution provided by the apparatus to resolve the problem is similar to the implementation solution recorded in the foregoing method. Therefore, for a specific limitation in one or more reply content processing apparatus embodiments provided below, refer to the limitations on the reply content processing method. For a specific limitation in one or more apparatus embodiments for interactive content of media content provided below, refer to the limitations on the method for interactive content of media content. This is not described again herein.

Figure 17:
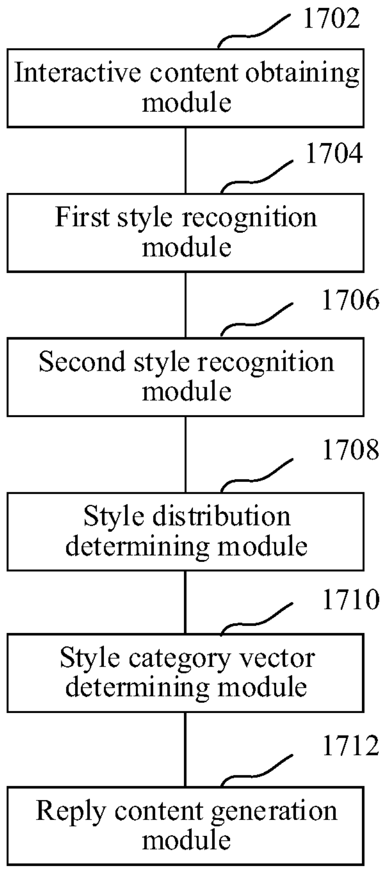
FIG. 17 is a structural block diagram of a reply content processing apparatus according to some embodiments.

In some embodiments, as shown in FIG. 17, a reply content processing apparatus is provided, including: an interactive content obtaining module 1702, a first style recognition module 1704, a second style recognition module 1706, a style distribution determining module 1708, a style category vector determining module 1710, and a reply content generation module 1712, where the interactive content obtaining module 1702 is configured to obtain to-be-replied interactive content for media content;

the first style recognition module 1704 is configured to perform encoding processing on description content of the media content and the to-be-replied interactive content, to obtain a vectorized representation of each word in the description content and the to-be-replied interactive content, and perform style recognition based on the vectorized representation of each word in the description content and the to-be-replied interactive content, to obtain a first style category set to which the to-be-replied interactive content belongs;

the second style recognition module 1706 is configured to perform style recognition based on release party information of the to-be-replied interactive content, to obtain a second style category set to which the release party information belongs;

the style distribution determining module 1708 is configured to determine, according to the first style category set and the second style category set, a third style category set to which the to-be-replied interactive content belongs;

the style category vector determining module 1710 is configured to determine a style category vector corresponding to each style category in the third style category set; and the reply content generation module 1712 is configured to perform reply word prediction based on the description content, the to-be-replied interactive content, and the style category vector, to generate reply content corresponding to each style category.

In the reply content processing apparatus, to-be-replied interactive content for media content is obtained, encoding processing is performed on description content of the media content and the to-be-replied interactive content, to obtain a vectorized representation of each word in the description content and the to-be-replied interactive content, style recognition is performed based on the vectorized representation of each word in the description content and the to-be-replied interactive content, to obtain a first style category set to which the to-be-replied interactive content belongs, style recognition is performed based on release party information of the to-be-replied interactive content, to obtain a second style category set to which the release party information belongs, a third style category set to which the to-be-replied interactive content belongs may be determined according to the first style category set and the second style category set, the style category of the to-be-replied interactive content may be determined by simultaneously considering the description content of the media content, the to-be-replied interactive content, and the style category of the release party information of the to-be-replied interactive content, which may improve accuracy of style recognition, and implement accurate recognition of the third style category set of the to-be-replied interactive content, so that a style category vector corresponding to each style category in the third style category set may be determined, and reply word prediction is performed based on the description content, the to-be-replied interactive content, and the style category vector, to generate the reply content corresponding to each style category. By automatically generating reply content corresponding to each style category as selection for interactive content, the reply content does not need to be entered for replying, which may improve reply efficiency.

In some embodiments, the release party information includes at least one piece of historical interactive content of the release party. The second style recognition module is further configured to perform style recognition on the at least one piece of historical interactive content, to obtain a historical style category set respectively corresponding to the at least one piece of historical interactive content and a style category probability of each historical style category in the historical style category set, and perform weighted averaging on the style category probability of each historical style category, to obtain the second style category set to which the release party information belongs.

In some embodiments, the reply content generation module is further configured to obtain similar interactive content of the to-be-replied interactive content from interactive content of the media content, and perform reply word prediction based on the description content, the to-be-replied interactive content, the similar interactive content, and the style category vector, to generate the reply content corresponding to each style category.

In some embodiments, the reply content generation module is further configured to obtain the style similarity between the to-be-replied interactive content and each interactive content of the media content, and to separately obtain the content similarity between the to-be-replied interactive content and each interactive content, and based on the style similarity and the content similarity that correspond to each interactive content, select similar interactive content of the to-be-replied interactive content from the interactive content of the media content.

In some embodiments, the reply content generation module is further configured to perform word segmentation on the description content, the to-be-replied interactive content, and similar interactive content, to obtain a segmented word set, perform vectorization processing on each word in the segmented word set, to obtain a vectorized representation of each word in the segmented word set, perform reply word prediction based on the vectorized representation of each word in the segmented word set and the style category vector, obtain at least one predicted reply word corresponding to each style category, and generate, based on at least one predicted reply word corresponding to each style category, reply content corresponding to each style category.

In some embodiments, targeting each style category, the reply content generation module is further configured to perform reply word prediction based on the vectorized representation of each word in the segmented word set and a style category vector of the targeted style category, to obtain a current reply word corresponding to the targeted style category, when the reply word prediction meets the prediction stop condition, use the current reply word as at least one predicted reply word corresponding to the targeted style category, when the reply word prediction meets the prediction continuing condition, continue to perform reply word prediction based on the vectorized representation of each word in the segmented word set, the style category vector of the targeted style category, and the current reply word, to obtain at least one predicted reply word corresponding to the targeted style category.

In some embodiments, the reply content generation module is further configured to perform similarity calculation on the vectorized representation of each word in the segmented word set and the style category vector of the targeted style category, to obtain a copy probability corresponding to each word in the segmented word set, when there is at least one first word whose copy probability is greater than or equal to the copy probability threshold, obtain, based on the at least one first word, the current reply word corresponding to the targeted style category, when the copy probability each is less than the copy probability threshold, obtain the current reply word corresponding to the targeted style category from the preset word list.

In some embodiments, the preset word list includes a vectorized representation of at least one candidate word, and the reply content generation module is further configured to perform similarity calculation on the vectorized representation of each candidate word in the preset word list and the style category vector of the targeted style category when the copy probability each is less than the copy probability threshold, to obtain the word similarity corresponding to each candidate word, and obtain, based on the word similarity, the current reply word corresponding to the targeted style category.

In some embodiments, the reply content generation module is further configured to, when the reply word prediction meets the prediction continuing condition, perform reply word prediction based on the vectorized representation of each word in the segmented word set, the style category vector of the targeted style category, and the current reply word, to obtain a next reply word corresponding to the current reply word, use the next reply word as a new current reply word, jump to an operation of performing reply word prediction based on the vectorized representation of each word in the segmented word set, the style category vector of the targeted style category, and the current reply word, to obtain the next reply word corresponding to the current reply word until the reply word prediction meets the prediction stop condition, and obtain, based on the current reply word obtained by performing reply word prediction each time, at least one predicted reply word corresponding to the targeted style category.

In some embodiments, the reply content processing apparatus further includes a sorting module. The sorting module is configured to obtain the fourth style category set corresponding to the reply content and the fifth style category set of the reply content release party corresponding to the reply content, obtain, based on the fourth style category set and the fifth style category set, the style similarity corresponding to the reply content, and perform interaction prediction based on the reply content, the fourth style category set, the description content, the to-be-replied interactive content, and the third style category set, to obtain the estimated interaction rate corresponding to the reply content. The estimated interaction rate corresponding to the reply content refers to a probability that the reply content obtained by prediction is interacted with. According to the style similarity and the estimated interaction rate that correspond to the reply content, the reply content is sorted, to obtain a reply content sorting result.

In some embodiments, the sorting module is further configured to encode the reply content and the fourth style category set, to obtain a first vector representation corresponding to the reply content, encode the to-be-replied interactive content and the third style category set, to obtain a second vector representation corresponding to the to-be-replied interactive content, perform encode the description content, to obtain a vector representation corresponding to the description content, and fuse the vector representation corresponding to the description content, the first vector representation, and the second vector representation, to obtain the estimated interaction rate corresponding to the reply content.

Figure 18:
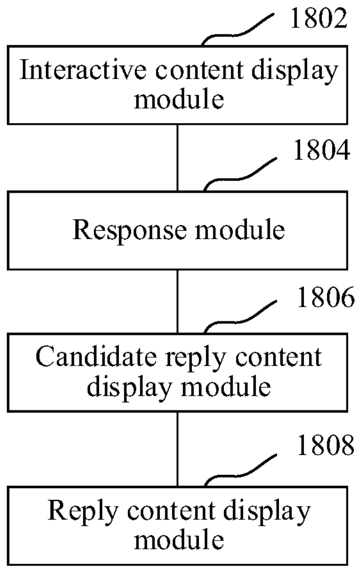
FIG. 18 is a structural block diagram of an interaction apparatus for interactive content of media content according to some embodiments.

In some embodiments, as shown in FIG. 18, an interaction apparatus for interactive content of media content is provided, including: an interactive content display module 1802, a response module 1804, a candidate reply content display module 1806, and a reply content display module 1808, where

- the interactive content display module 1802 is configured to obtain interactive content for media content, and display the interactive content;
- the response module 1804 is configured to determine, in response to a trigger event for any interactive content, the interactive content indicated by the trigger event as to-be-replied interactive content;
- the candidate reply content display module 1806 is configured to, in response to the to-be-replied interactive content, determine a style category set to which the to-be-replied interactive content belongs, generate candidate reply content corresponding to each style category in the style category set, and display the candidate reply content corresponding to each style category; and
- the reply content display module 1808 is configured to display, in response to a selection event for any candidate reply content, the candidate reply content selected by the selection event as interactive content that replies to the to-be-replied interactive content.

In the foregoing interaction apparatus for interactive content of media content, by displaying the interactive content of the media content, in response to a trigger event for any interactive content, the interactive content indicated by the trigger event is determined as the to-be-replied interactive content, corresponding to the to-be-replied interactive content, style recognition is performed on the to-be-replied interactive content, the style category set to which the to-be-replied interactive content belongs is determined, the candidate reply content corresponding to each style category in the style category set is generated, and the candidate reply content corresponding to each style category is displayed, which may provide the candidate reply content corresponding to each style category as selection for the interactive content. In this way, in response to a selection event of any candidate reply content, the candidate reply content selected by the selection event may be displayed as the interactive content that replies to the to-be-replied interactive content, so that the reply content does not need to be entered for replying, and reply efficiency may be improved.

In some embodiments, the candidate reply content display module is further configured to perform interaction prediction based on the candidate reply content corresponding to each style category, the to-be-replied interactive content, and the description content of the media content, to obtain an estimated interaction rate corresponding to the candidate reply content corresponding to each style category, where the estimated interaction rate corresponding to the candidate reply content refers to a probability that candidate reply content obtained by prediction is interacted with, and display the candidate reply content corresponding to each style category in descending order of the estimated interaction rate.

In some embodiments, the candidate reply content display module is further configured to determine the style category vector corresponding to each style category in the style category set, and perform reply word prediction according to description content of the media content, the to-be-replied interactive content, and the style category vector, to generate the candidate reply content corresponding to each style category in the style category set.

Each module in the foregoing reply content processing apparatus and the interaction apparatus for interactive content of media content may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a server, and an internal structure diagram thereof may be shown in FIG. 19. The computer device includes a processor, a memory, an input/output interface (I/O), and a communication interface. The processor, the memory, and the input/output interface are connected through the system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store data such as a preset word list. The input/output interface of the computer device is configured to exchange information between the processor and the external device. The communication interface of the computer device is configured to communicate with an external terminal through a network connection. When executed by a processor, the computer-readable instruction implements a reply content processing method.

In some embodiments, a computer device is provided. The computer device may be a terminal, and an internal structure diagram thereof may be shown in FIG. 20. The computer device includes a processor, a memory, an input/output interface, a communication interface, a display unit, and an input apparatus. The processor, the memory, and the input/output interface are connected through the system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instruction in the non-volatile storage medium. The input/output interface of the computer device is configured to exchange information between the processor and the external device. The communication interface of the computer device is used for wired or wireless communication with external terminals. A wireless manner may be implemented through WIFI, mobile cellular network, near field communication (NFC), or other technologies. When executed by a processor, the computer-readable instruction implements an interaction method for interactive content of media content. The display unit of the computer device is configured to form a visually visible picture, which may be a display screen, a projection apparatus, or a virtual reality imaging apparatus. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 19:
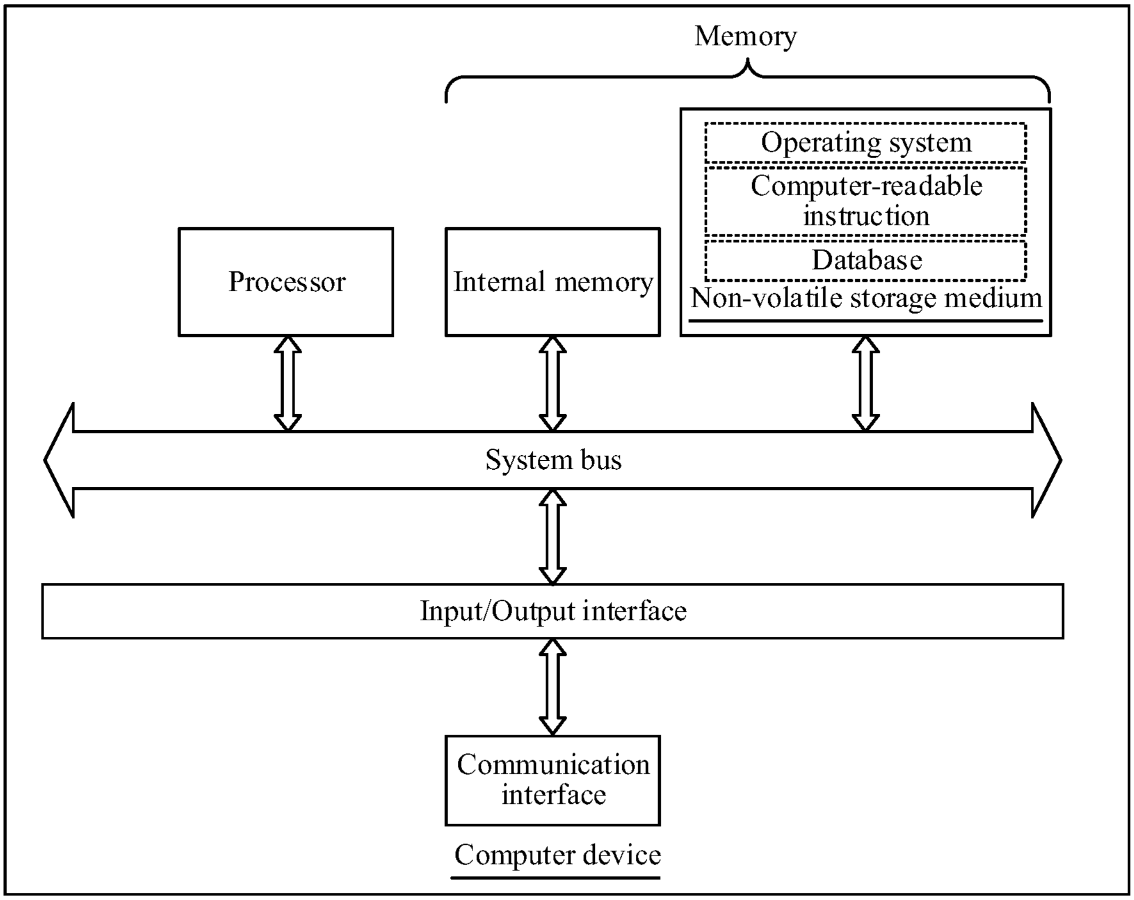
FIG. 19 is a diagram of an internal structure of a computer device according to some embodiments.
Figure 20:
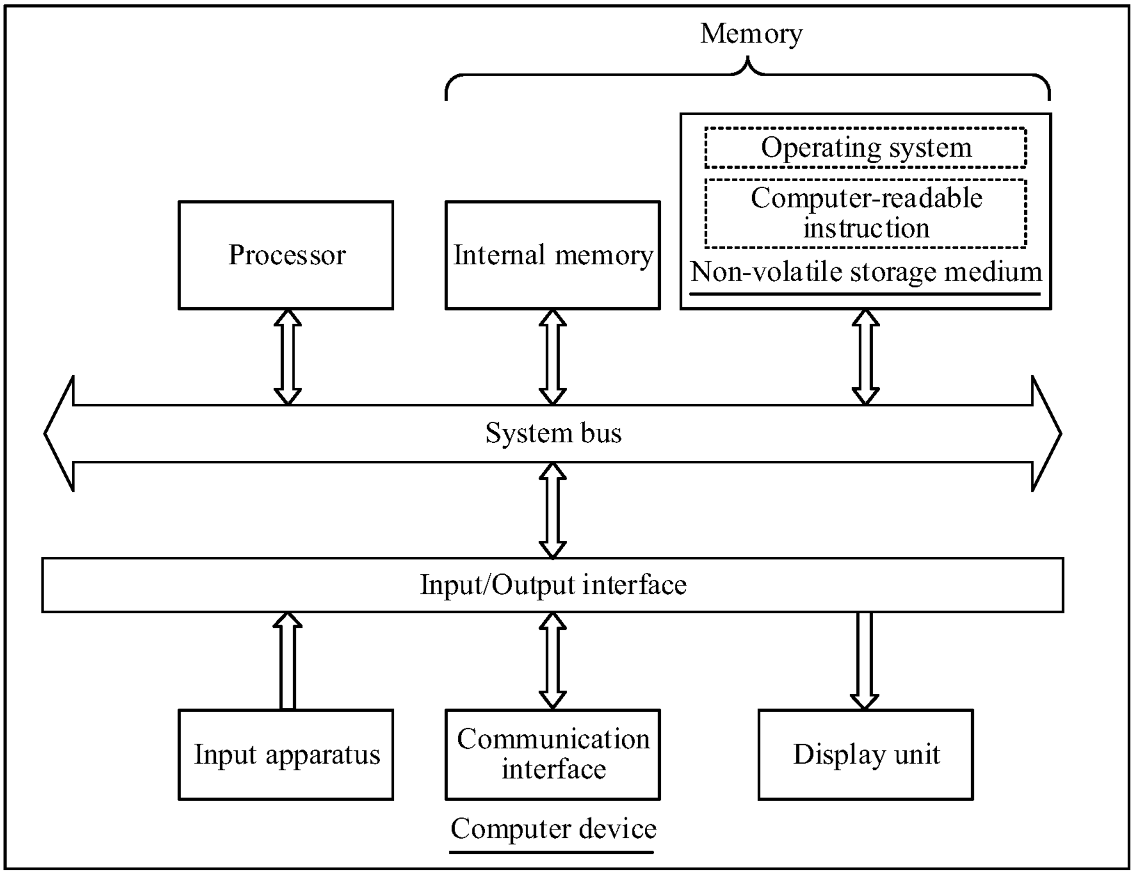
FIG. 20 is a diagram of an internal structure of a computer device according to some embodiments.

A person skilled in the art may understand that the structure shown in FIG. 19 and FIG. 20 is only a block diagram of a partial structure related to the solution of this application, and does not limit the computer device to which the solution of this application is applied. In some embodiments, the computer device may include more or fewer components than those shown in the figure, or some components may be combined, or different component deployment may be used.

In some embodiments, a computer device is further provided, including a memory and a processor, the memory storing computer-readable instructions, the computer-readable instructions, when executed by the processor, causing the processor to implement the operations of the foregoing method embodiments.

In some embodiments, a computer-readable storage medium is provided, storing computer-readable instructions, the computer-readable instructions, when executed by a processor, implement the operations in the method embodiments.

In some embodiments, a computer program product is provided, the computer program product including computer-readable instructions, the computer-readable instructions being stored in a computer-readable storage medium. A processor of a computer device reads the computer-readable instructions from the computer-readable storage medium and executes the computer-readable instructions, to cause the computer device to perform the operations of the foregoing method embodiments.

The information (including but not limited to the release party information, and the like) and data (including but not limited to data configured for analysis, stored data, displayed data, and the like) involved in this application are authorized by the object or fully authorized by all parties, and collection, use, and processing of related data need to comply with the related laws, regulations, and standards of related countries and regions.

A person of ordinary skill in the art may understand that some or all procedures in the method in the foregoing embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache memory. As a description and not a limit, the RAM may be in a plurality of forms, such as a static random access memory (SRAM) or a dynamic random access memory (DRAM). The databases involved in various embodiments provided in this application may include at least one of a relational database and a non-relational database. The non-relational database may include a blockchain-based distributed database, and the like, but is not limited thereto. The processors involved in the various embodiments provided in this application may be a general-purpose processor, a central processing unit, a graphics processor, a digital signal processor, a programmable logic device, a quantum computing-based data processing logic device, and the like, and are not limited thereto.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in the disclosure.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A reply content processing method, performed by a computer device, comprising:

obtaining to-be-replied interactive content for media content;

performing encoding processing on description content of the media content and the to-be-replied interactive content to obtain a vectorized representation of each word in the description content and the to-be-replied interactive content, and performing style recognition based on the vectorized representation of each word in the description content and the to-be-replied interactive content to obtain a first style category set to which the to-be-replied interactive content belongs;

performing style recognition based on release party information of the to-be-replied interactive content to obtain a second style category set to which the release party information belongs;

determining, according to the first style category set and the second style category set, a third style category set to which the to-be-replied interactive content belongs, the third style category set comprising at least one style of the first style category set and at least one style of the second style category set;

determining a style category vector corresponding to each style category in the third style category set; and performing reply word prediction based on the description content, the to-be-replied interactive content, and the style category vector to generate reply content corresponding to each style category.

2. The reply content processing method according to claim 1, wherein the release party information comprises at least one piece of historical interactive content of a release party; and the performing style recognition comprises:

performing style recognition on the at least one piece of historical interactive content to obtain a historical style category set respectively corresponding to the at least one piece of historical interactive content and a style category probability of each historical style category in the historical style category set; and performing weighted averaging on the style category probability of each historical style category, to obtain the second style category set to which the release party information belongs.

3. The reply content processing method according to claim 1, wherein the method further comprises:

obtaining similar interactive content of the to-be-replied interactive content from interactive content of the media content; and the performing reply word prediction comprises:

performing reply word prediction based on the description content, the to-be-replied interactive content, the similar interactive content, and the style category vector to generate the reply content corresponding to each style category.

4. The reply content processing method according to claim 3, wherein obtaining the similar interactive content comprises:

separately obtaining a style similarity between the to-be-replied interactive content and each interactive content of the media content, and separately obtaining content similarity between the to-be-replied interactive content and each interactive content; and selecting the similar interactive content of the to-be-replied interactive content from the interactive content of the media content based on the style similarity and the content similarity that correspond to each interactive content.

5. The reply content processing method according to claim 3, wherein the performing reply word prediction based on the description content, the to-be-replied interactive content, the similar interactive content, and the style category vector comprises:

performing word segmentation on the description content, the to-be-replied interactive content, and the similar interactive content to obtain a segmented word set;

performing vectorization processing on each word in the segmented word set to obtain a vectorized representation of each word in the segmented word set;

performing reply word prediction based on the vectorized representation of each word in the segmented word set and the style category vector, to obtain at least one predicted reply word corresponding to each style category; and separately generating the reply content corresponding to each style category based on the at least one predicted reply word corresponding to each style category.

6. The reply content processing method according to claim 5, wherein the performing reply word prediction based on the vectorized representation of each word in the segmented word set and the style category vector comprises:

performing, targeting each style category, reply word prediction based on the vectorized representation of each word in the segmented word set and a style category vector of the targeted style category, to obtain a current reply word corresponding to the targeted style category;

using, based on the reply word prediction meeting a prediction stop condition, the current reply word as the at least one predicted reply word corresponding to the targeted style category; and continuing to perform reply word prediction based on the vectorized representation of each word in the segmented word set, the style category vector of the targeted style category, and the current reply word based on the reply word prediction meeting a prediction continuing condition, to obtain the at least one predicted reply word corresponding to the targeted style category.

7. The reply content processing method according to claim 6, wherein the performing reply word prediction based on the vectorized representation of each word in the segmented word set and the style category vector of the targeted style category comprises:

performing similarity calculation on the vectorized representation of each word in the segmented word set and the style category vector of the targeted style category, to obtain a copy probability corresponding to each word in the segmented word set;

obtaining, based on there being at least one first word whose copy probability is greater than or equal to a copy probability threshold based on the at least one first word, the current reply word corresponding to the targeted style category; and obtaining the current reply word corresponding to the targeted style category from a preset word list based on the copy probability each being less than the copy probability threshold.

8. The reply content processing method according to claim 7, wherein the preset word list comprises a vectorized representation of at least one candidate word; and the obtaining the current reply word corresponding to the targeted style category from the preset word list comprises:

performing similarity calculation on the vectorized representation of each candidate word in the preset word list and the style category vector of the targeted style category based on the copy probability each being less than the copy probability threshold, to obtain word similarity corresponding to each candidate word; and obtaining, based on the word similarity, the current reply word corresponding to the targeted style category.

9. The reply content processing method according to claim 6, wherein the continuing to perform reply word prediction comprises:

performing reply word prediction based on the vectorized representation of each word in the segmented word set, the style category vector of the targeted style category, and the current reply word based on the reply word prediction meeting the prediction continuing condition, to obtain a next reply word corresponding to the current reply word;

performing reply word prediction based on the vectorized representation of each word in the segmented word set, the style category vector of the targeted style category, and the current reply word, to obtain another next reply word corresponding to the current reply word by using the next reply word as a new current reply word; and obtaining the at least one predicted reply word corresponding to the targeted style category based on the new current reply word obtained by performing reply word prediction each time until the reply word prediction meets the prediction stop condition.

10. The reply content processing method according to claim 1, wherein after performing the reply word prediction, the reply content processing method further comprises:

obtaining a fourth style category set corresponding to the reply content and a fifth style category set of a reply content release party corresponding to the reply content;

obtaining, based on the fourth style category set and the fifth style category set, a style similarity corresponding to the reply content;

performing interaction prediction based on the reply content, the fourth style category set, the description content, the to-be-replied interactive content, and the third style category set to obtain an estimated interaction rate corresponding to the reply content, wherein the estimated interaction rate corresponding to the reply content refers to a probability that reply content obtained by prediction is interacted with; and sorting the reply content according to the style similarity and the estimated interaction rate that correspond to the reply content to obtain a reply content sorting result.

11. The reply content processing method according to claim 10, wherein the performing interaction prediction comprises:

encoding the reply content and the fourth style category set to obtain a first vector representation corresponding to the reply content, and encoding the to-be-replied interactive content and the third style category set to obtain a second vector representation corresponding to the to-be-replied interactive content;

encoding the description content, to obtain a vector representation corresponding to the description content; and fusing the vector representation corresponding to the description content, the first vector representation, and the second vector representation to obtain the estimated interaction rate corresponding to the reply content.

12. A reply content processing apparatus, comprising:

at least one memory configured to store program code; and at least one processor configured to read the program code and operate as instructed by the program code, the program code comprising:

interactive content obtaining code configured to cause at least one of the at least one processor to obtain to-be-replied interactive content for media content;

first style recognition code configured to cause at least one of the at least one processor to perform encoding processing on description content of the media content and the to-be-replied interactive content to obtain a vectorized representation of each word in the description content and the to-be-replied interactive content, and perform style recognition based on the vectorized representation of each word in the description content and the to-be-replied interactive content to obtain a first style category set to which the to-be-replied interactive content belongs;

second style recognition code configured to cause at least one of the at least one processor to perform style recognition based on release party information of the to-be-replied interactive content to obtain a second style category set to which the release party information belongs;

style distribution determining code configured to cause at least one of the at least one processor to determine, according to the first style category set and the second style category set, a third style category set to which the to-be-replied interactive content belongs, the third style category set comprising at least one style of the first style category set and at least one style of the second style category set;

style category vector determining code configured to cause at least one of the at least one processor to determine a style category vector corresponding to each style category in the third style category set; and reply content generation code configured to cause at least one of the at least one processor to perform reply word prediction based on the description content, the to-be-replied interactive content, and the style category vector to generate reply content corresponding to each style category.

13. The reply content processing apparatus according to claim 12, wherein the release party information comprises at least one piece of historical interactive content of a release party; and the second style recognition code is further configured to cause at least one of the at least one processor to:

perform style recognition on the at least one piece of historical interactive content to obtain a historical style category set respectively corresponding to the at least one piece of historical interactive content and a style category probability of each historical style category in the historical style category set; and perform weighted averaging on the style category probability of each historical style category to obtain the second style category set to which the release party information belongs.

14. The reply content processing apparatus according to claim 12, wherein the reply content generation code is further configured to cause at least one of the at least one processor to obtain similar interactive content of the to-be-replied interactive content from interactive content of the media content; and perform reply word prediction based on the description content, the to-be-replied interactive content, the similar interactive content, and the style category vector to generate the reply content corresponding to each style category.

15. The reply content processing apparatus according to claim 14, wherein the reply content generation code is further configured to cause at least one of the at least one processor to:

separately obtain a style similarity between the to-be-replied interactive content and each interactive content of the media content, and separately obtain content similarity between the to-be-replied interactive content and each interactive content; and select the similar interactive content of the to-be-replied interactive content from the interactive content of the media content based on the style similarity and the content similarity that correspond to each interactive content.

16. The reply content processing apparatus according to claim 14, wherein the reply content generation code is further configured to cause at least one of the at least one processor to:

perform word segmentation on the description content, the to-be-replied interactive content, and the similar interactive content to obtain a segmented word set;

perform vectorization processing on each word in the segmented word set to obtain a vectorized representation of each word in the segmented word set;

perform reply word prediction based on the vectorized representation of each word in the segmented word set and the style category vector to obtain at least one predicted reply word corresponding to each style category; and separately generate the reply content corresponding to each style category based on the at least one predicted reply word corresponding to each style category.

17. The reply content processing apparatus according to claim 16, wherein the reply content generation code is further configured to cause at least one of the at least one processor to:

perform, targeting each style category, reply word prediction based on the vectorized representation of each word in the segmented word set and a style category vector of the targeted style category to obtain a current reply word corresponding to the targeted style category;

use, based on the reply word prediction meeting a prediction stop condition, the current reply word as the at least one predicted reply word corresponding to the targeted style category; and continue to perform reply word prediction based on the vectorized representation of each word in the segmented word set, the style category vector of the targeted style category, and the current reply word based on the reply word prediction meeting a prediction continuing condition, to obtain the at least one predicted reply word corresponding to the targeted style category.

18. The reply content processing apparatus according to claim 17, wherein reply content generation code is further configured to cause at least one of the at least one processor to:

perform similarity calculation on the vectorized representation of each word in the segmented word set and the style category vector of the targeted style category to obtain a copy probability corresponding to each word in the segmented word set;

obtain, based on there being at least one first word whose copy probability is greater than or equal to a copy probability threshold based on the at least one first word, the current reply word corresponding to the targeted style category; and obtain the current reply word corresponding to the targeted style category from a preset word list based on the copy probability each being less than the copy probability threshold.

19. The reply content processing apparatus according to claim 18, wherein the preset word list comprises a vectorized representation of at least one candidate word; and the reply content generation code is further configured to cause at least one of the at least one processor to:

perform similarity calculation on the vectorized representation of each candidate word in the preset word list and the style category vector of the targeted style category based on the copy probability each being less than the copy probability threshold, to obtain word similarity corresponding to each candidate word; and obtain, based on the word similarity, the current reply word corresponding to the targeted style category.

20. A non-transitory computer-readable storage medium storing computer code which, when executed by at least one processor, causes the at least one processor to at least:

obtain to-be-replied interactive content for media content;

perform encoding processing on description content of the media content and the to-be-replied interactive content to obtain a vectorized representation of each word in the description content and the to-be-replied interactive content, and perform style recognition based on the vectorized representation of each word in the description content and the to-be-replied interactive content to obtain a first style category set to which the to-be-replied interactive content belongs;

perform style recognition based on release party information of the to-be-replied interactive content to obtain a second style category set to which the release party information belongs;

determine, according to the first style category set and the second style category set, a third style category set to which the to-be-replied interactive content belongs, the third style category set comprising at least one style of the first style category set and at least one style of the second style category set;

determine a style category vector corresponding to each style category in the third style category set; and perform reply word prediction based on the description content, the to-be-replied interactive content, and the style category vector to generate reply content corresponding to each style category.

* * * * *